US010863589B2

(12) United States Patent
Lee et al.

(10) Patent No.: US 10,863,589 B2
(45) Date of Patent: Dec. 8, 2020

(54) COOKING APPLIANCE

(71) Applicant: LG ELECTRONICS INC., Seoul (KR)

(72) Inventors: Jeonghyun Lee, Seoul (KR); Sungho Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 282 days.

(21) Appl. No.: 15/855,298

(22) Filed: Dec. 27, 2017

(65) Prior Publication Data
US 2018/0184488 A1 Jun. 28, 2018

(30) Foreign Application Priority Data
Dec. 27, 2016 (KR) .................. 10-2016-0180502

(51) Int. Cl.
*H05B 3/68* (2006.01)
*F24C 15/18* (2006.01)
(Continued)

(52) U.S. Cl.
CPC ............. *H05B 3/68* (2013.01); *B65B 25/001* (2013.01); *B65B 29/08* (2013.01); *B65B 31/024* (2013.01);
(Continued)

(58) Field of Classification Search
CPC .......... A47J 27/10; A47J 27/12; A47J 27/18; H05B 3/68; F24C 15/18; B65B 29/08;
(Continued)

(56) References Cited

U.S. PATENT DOCUMENTS

| 4,922,079 A | 5/1990 | Bowen et al. |
| 7,059,240 B2 | 6/2006 | Kim |

(Continued)

FOREIGN PATENT DOCUMENTS

| EP | 2 000 741 | 12/2008 |
| EP | 2 954 809 | 12/2015 |

(Continued)

OTHER PUBLICATIONS

European Search Report dated May 16, 2018 issued in Application No. 17210209.7.
(Continued)

*Primary Examiner* — David J Walczak
(74) *Attorney, Agent, or Firm* — KED & Associates LLP

(57) ABSTRACT

A low-temperature vacuum cooking device and a cooking appliance including low-temperature vacuum cooking device are provided. The cooking appliance may include a housing including a container mount and a vacuum-packing module mount provided adjacent to each other, a first container having a space to accommodate a liquid therein, the first container being configured to be coupled with the container mount, a heater that heats the liquid accommodated in the first container, a vacuum pressure generator installed on the vacuum-packing module mount to suction air inside a food packing bag, a sealer installed adjacent to the vacuum pressure generator that heats the food packing bag in order to seal it, a cover rotatably installed on the housing to cover or open the first container and the vacuum pressure generator, and a high-temperature cooking unit including a top plate and a high-temperature heater provided at a lower portion of the top plate.

16 Claims, 18 Drawing Sheets

(51) Int. Cl.
 *B65B 29/08* (2006.01)
 *B65B 31/02* (2006.01)
 *B65B 51/14* (2006.01)
 *B65B 25/00* (2006.01)
(52) U.S. Cl.
 CPC .......... *B65B 51/146* (2013.01); *B65B 51/148* (2013.01); *F24C 15/18* (2013.01)
(58) Field of Classification Search
 CPC ... B65B 31/024; B65B 51/146; B65B 51/148; B65B 25/001
 USPC .......................................... 99/330, 331, 339
 See application file for complete search history.

(56) References Cited

U.S. PATENT DOCUMENTS

| | | | |
|---|---|---|---|
| 2015/0040516 A1* | 2/2015 | Torre | B65B 25/22 53/167 |
| 2018/0184488 A1 | 6/2018 | Lee | |

FOREIGN PATENT DOCUMENTS

| | | |
|---|---|---|
| JP | 2002-15939 | 6/2002 |
| JP | 2002-159397 | 6/2002 |
| JP | 3599664 | 12/2004 |
| JP | 2005-247383 | 9/2005 |
| JP | 2008-175421 | 7/2008 |
| KR | 10-2006-0013768 | 2/2006 |
| KR | 10-2012-0115212 | 10/2012 |
| KR | 10-1335304 | 12/2013 |
| KR | 10-1626414 | 6/2016 |
| WO | WO 2013/124872 | 8/2013 |
| WO | WO 2013/134785 | 9/2013 |
| WO | WO 2015/056284 | 4/2015 |
| WO | WO 2016/182323 | 11/2016 |

OTHER PUBLICATIONS

European Search Report dated May 8, 2018 issued in Application No. 17210216.2.
U.S. Office Action issued in U.S. Appl. No. 15/855,569 dated Jun. 10, 2020.
U.S. Office Action dated Feb. 13, 2020 issued in U.S. Appl. No. 15/855,569.
U.S. Appl. No. 15/855,569, filed Dec. 27, 2017.

* cited by examiner

COOKING APPLIANCE

CROSS-REFERENCE TO RELATED APPLICATION

This application claims priority under 35 U.S.C. § 119 to Korean Application No. 10-2016-0180502, filed on Dec. 27, 2016, whose entire disclosure is incorporated herein by reference.

BACKGROUND

1. Field

A cooking appliance capable of cooking a variety of foods in a variety of ways is disclosed herein.

2. Background

A cooking appliance is a kind of household appliance that is installed in a kitchen and is used to cook food or other items (hereinafter "food"). Cooking appliances may be classified by its heat source, shape, or type of fuel used. Cooking appliances may be classified as open-type cooking appliances or closed-type cooking appliances depending on where food is placed and how the cooking appliance cooks the food. Closed-type cooking appliances may include, for example an oven or a microwave oven, while open-type cooking appliances may include, for example, a cooktop or a hob.

A closed-type cooking appliance has a closed space where food may be placed, and food is cooked by heating the closed space. A closed-type cooking appliance may include a chamber in which food is placed and which is closed during cooking. A heat source may be provided inside or outside the chamber to heat it. An open-type cooking device has an open space with a surface where food or a dish or plate with food may be placed, and the food is cooked by heating the surface of the open space. In an open-type cooking appliance, a plurality of heaters or burners may be installed to allow a number of foods to be cooked at the same time.

A hybrid cooking appliance is a cooking appliance in which a closed-type cooking appliance and an open-type cooking appliance may be provided together, where a plurality of heat sources may be provided to cook various types of foods simultaneously. In a hybrid cooking appliance, an open-type cooking appliance may be placed above a closed-type cooking appliance. Such cooking appliances with a plurality of heat sources may also include a channel for cold air to cool down the plurality of heat sources and electric components.

When a user, for example, cooks barbecue or bakes bread in an oven or grills fish, the closed-type cooking appliance may be used. When a user, for example, cooks food on a dish or plate by heating it, the open-type cooking appliance may be used. In addition to cooking techniques, such as cooking with an oven, grilling, or steaming using open-type or closed-type cooking appliances, a variety of new cooking techniques have been developed, for example, cooking via sous-vide.

Sous-vide is a culinary technique that keeps, for example, nutrients, texture, and taste at its best by cooking food in a vacuum at a low-temperature. The technique was first described by Benjamin Thompson, Count Rumford in England in 1799 as a technique using air. It was re-discovered by American and French engineers in the mid-1960s. The technique was adopted by Georges Pralus in 1974, who used it for cooking foie gras. Bruno Goussault further developed this technique. Sous-vide is French for "under vacuum," which refers to low-temperature cooking in a vacuum. Since 1970, it has been used in some of the finest restaurants in Europe, and found in menus in expensive restaurants and hotels.

Sous-vide cooking is carried out by heating a sealed plastic bag containing food in water at a low temperature, for example, at approximately 50° C. to 60° C. Sous-vide cooking may be advantageous in that it maintains, for example, the food's original taste, texture, flavor, and nutrients. It may prevent meat from toughening as the meat's proteins deform while heating, and thus, meat may be soft without losing moisture and may be heated evenly.

In sous-vide cooking, maintaining the temperature of the water for a long time and reliably sealing the food to be cooked in a vacuum state are key. Sous-vide cooking may take a long time, for example, from 4 hours to 48 hours, and it may be difficult to control cooking temperature and cooking time. For effective sous-vide cooking, a cooking appliance dedicated to sous-vide may be needed. In order to pack the food to be cooked in a vacuum state, a separate vacuum packing machine may also be needed.

That is, even with an existing hybrid cooking appliance capable of cooking a variety of foods simultaneously, a cooking device dedicated for sous-vide cooking may still be needed. Further, a separate vacuum-packing machine for packing the food to be cooked in a vacuum state may also be required, which may be inconvenient and expensive. In addition, it may be difficult to find sufficient space for an open-type cooking appliance, a closed-type cooking appliance, or a hybrid cooking appliance, a cooking device for sous-vide cooking, and a vacuum-packing machine all together. If they are installed at different positions separated from one another, vacuum-packing, sous-vide cooking and other types cooking have to be carried out at different positions using different devices, which may be inconvenient.

BRIEF DESCRIPTION OF THE DRAWINGS

The embodiments will be described in detail with reference to the following drawings in which like reference numerals refer to like elements, and wherein.

DETAILED DESCRIPTION

Figure 1:
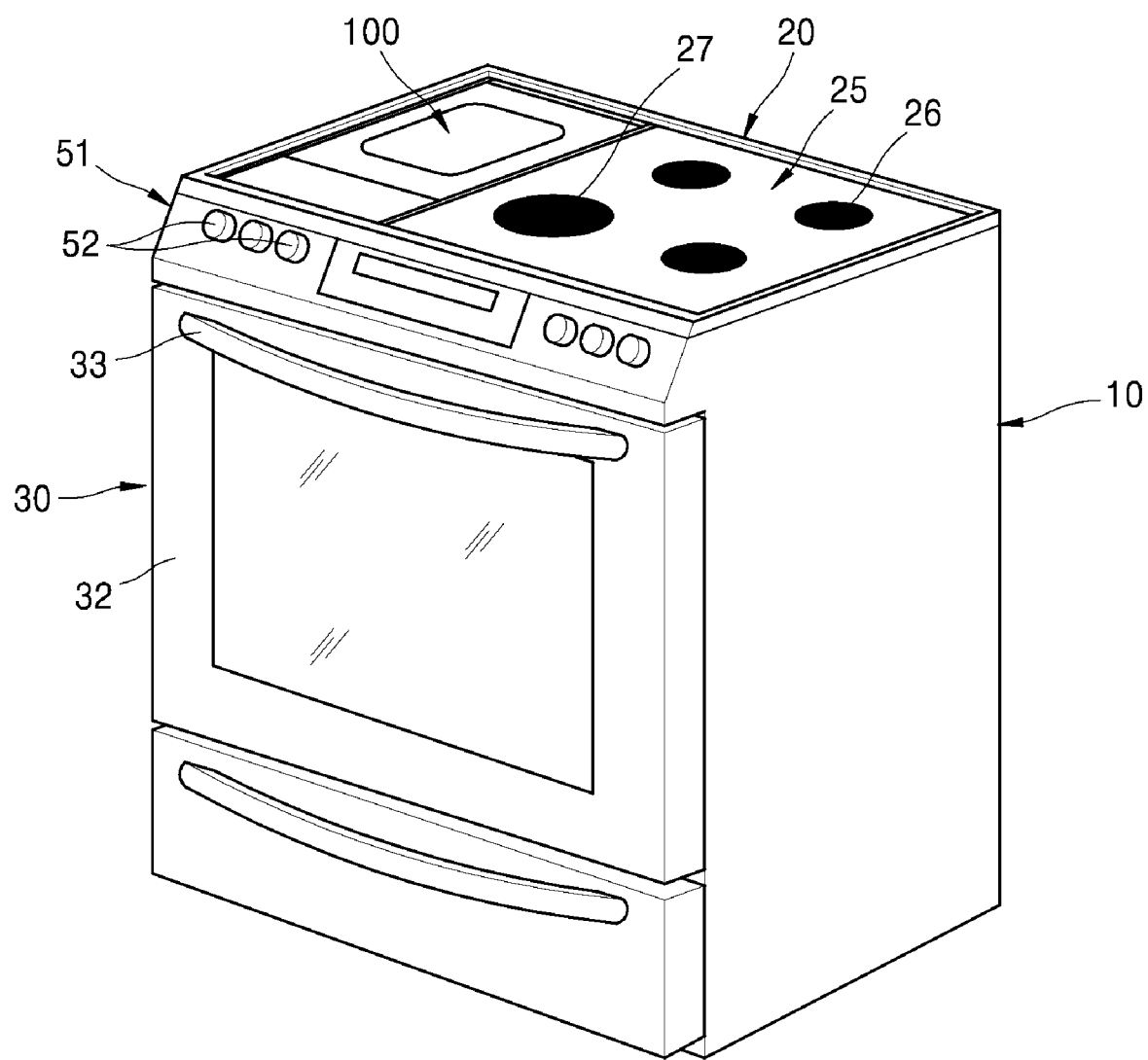
FIG. 1 is a perspective view of a cooking appliance according to an embodiment.
Figure 2:
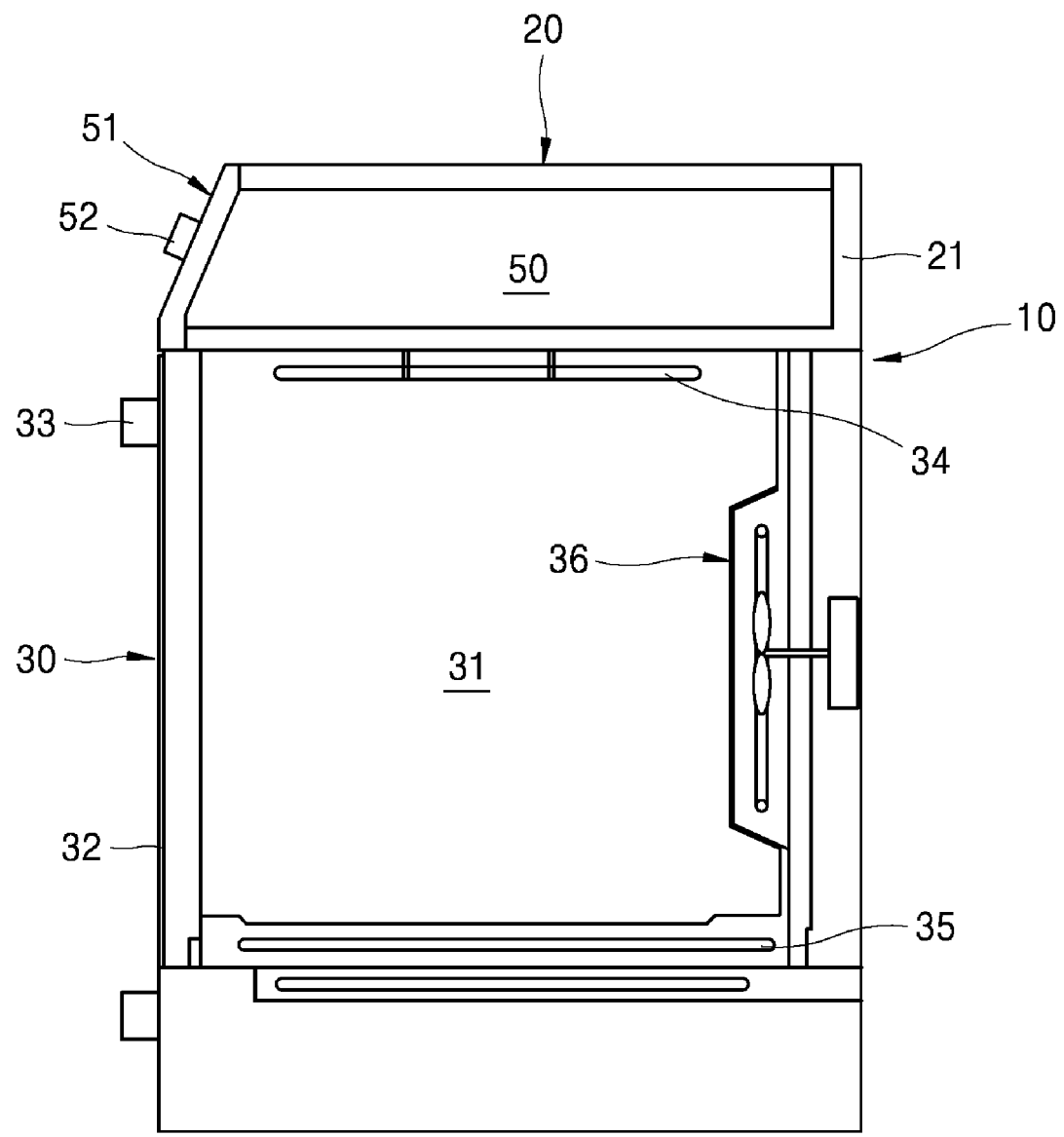
FIG. 2 is a side cross-sectional view of a cooking appliance according to an embodiment.

Referring to FIG. 1 and FIG. 2, an exterior of a cooling appliance according to an embodiment may be formed by a main body 10. The main body 10 may have a box shape and may be formed of a material having a predetermined strength to protect a plurality of parts or components provided therein. On a top area of the main body 10, a cooktop 20 may be provided to cook food placed thereon by heating the food or a container in which the food is placed. The cooktop 20 may include a cooktop case 21, a high-temperature cooking unit 25 and a low-temperature cooking unit 100. The cooktop 20 may cook food via the high-temperature cooking unit 25 and/or the low-temperature cooking unit 100.

An oven 30 may be installed under the cooktop 20. A cooking chamber 31 where food is cooked may be provided inside the oven 30. The cooking chamber 31 may be in a box shape with an open front face. Food may be cooked by heating an inner space of the cooking chamber 31 while the cooking chamber 31 is shielded, for example, by a door. That is, in the oven 30, food is cooked inside the cooking chamber 30.

An upper or first heater 34 that heats the inner space of the cooking chamber 31 from above may be provided at a top of the cooking chamber 31, while a lower or second heater 35 that heats the inner space of the cooking chamber 31 from below may be provided at a bottom of the cooking chamber 31.

A convection fan 36 may be provided at a rear of the cooking chamber 31 to heat the inner space of the cooking chamber 31 with convected hot air. The convection fan 36 may forcibly blow air in the inner space of the cooking chamber 31. The convection fan 36 may heat the inner space of the cooking chamber 31 by suctioning and heating the air in the inner space of the cooking chamber 31 and then discharging the air into the inner space of the cooking chamber 31. By doing so, the food in the inner space of the cooking chamber 31 may be uniformly heated.

A door 32 that opens and closes the cooking chamber 31 may be rotatably installed at or on the oven 30. The door 32 may be in a box shape having a predetermined thickness. On a front face of the door 32, a handle 33 may be attached in order for a user to grasp it to rotate or open the door 100. The user may easily open the door 33 by the handle 32.

A control panel 51 may be provided in or at a front of the cooktop 20, that is, above the door 32. The control panel 51 may have a box shape having a predetermined internal space. An input unit or input 52 may be provided on a front face of the control panel 51 to input a user's operation signals to operate the cooktop 20 and the oven 30. The input unit 52 may be provided with a plurality of operation switches. A user may directly input operation signals using the switches. The control panel 51 may include a display that displays operation information of the cooking appliance or cooking information of food. A user may see various information via the display.

In an internal space of the main body 20, for example, between the cooktop 20 and the oven 30, an electric chamber 50 may be provided where electrical components are located. The control panel 51 may be provided on a front face of the electric chamber 50, and the control panel 51 may substantially shield or cover the front face of the electric chamber 50.

Figure 3:
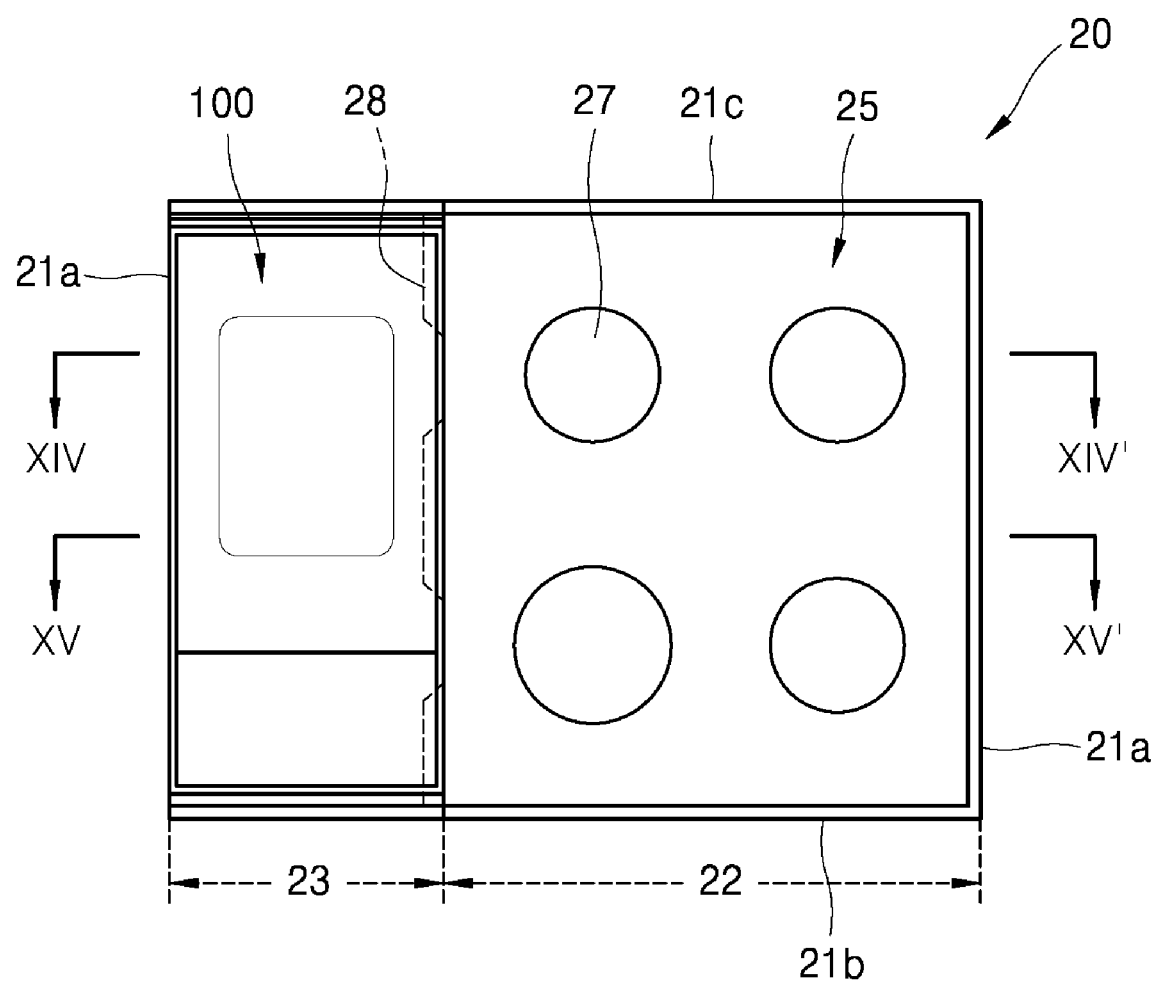
FIG. 3 is a plan view of a cooktop of a cooking appliance according to an embodiment.
Figure 4:
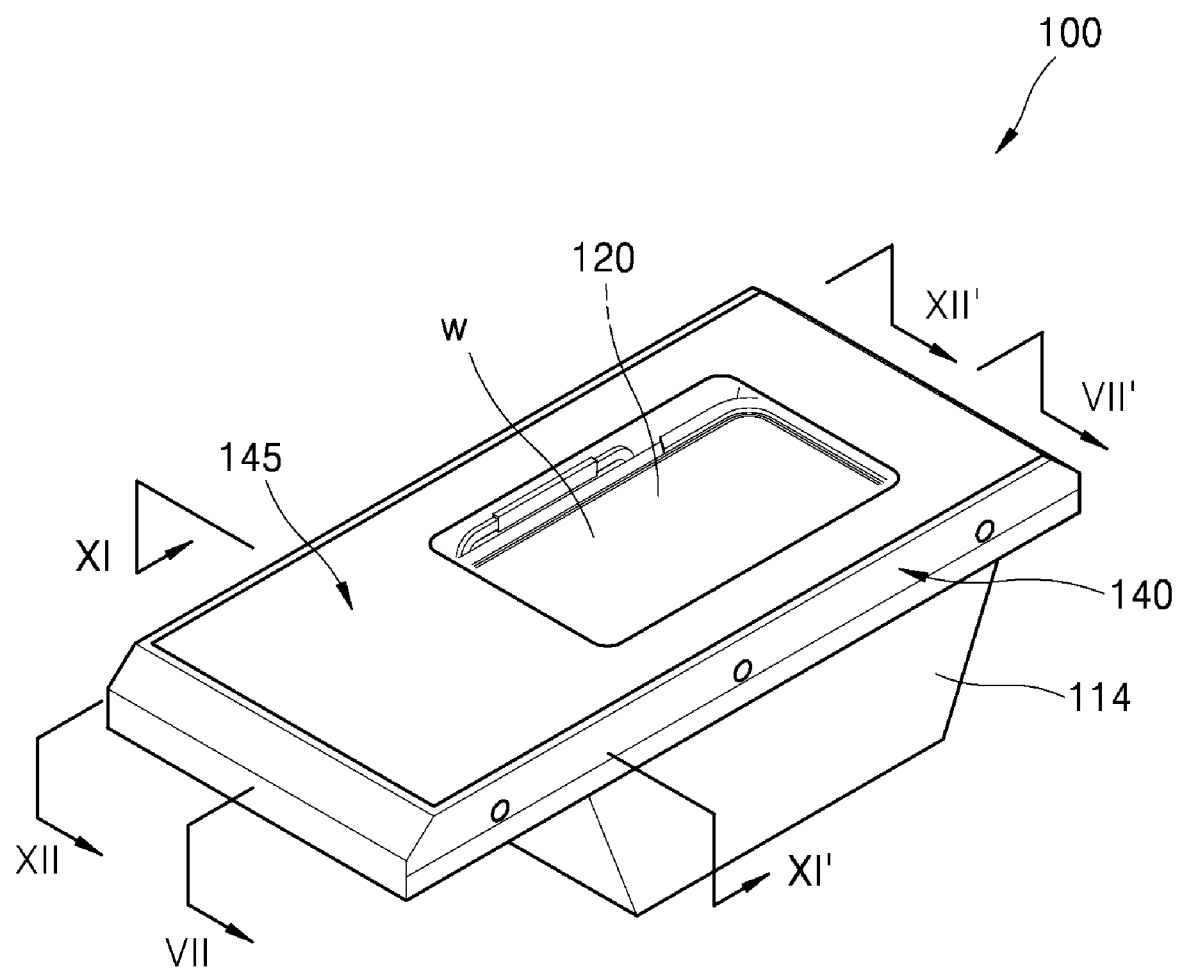
FIG. 4 is a perspective view of a low-temperature cooking unit according to an embodiment.

FIG. 3 is a plan view of a cooktop of a cooking appliance according to an embodiment in which a top plate has been removed. Referring to FIGS. 1 to 3, the cooktop 20 may include cooktop case 21, high-temperature cooking unit 25, and low-temperature cooking unit 100.

The cooktop case 21 may form an exterior of the cooktop 20. An internal space having an open top may be formed in the cooktop case 21. The internal space of the cooktop case 21 may be divided into a first area 22 and a second area 23. The first area 22 may be a space or area in the cooktop case 21 in or at which the high-temperature cooking unit 25 may be installed. The second area 23 may be a space or area in the cooktop case 21 in or at which the low-temperature cooking unit 100 may be installed. The first area 22 and the second area 23 may be arranged adjacent to each other in a lateral or first direction, and the first area 22 and the second area 23 may be separated by a barrier 28.

The high-temperature cooking unit 25 may be installed in or at the cooktop case 21 so as to be located in the first area 22 in the cooktop case 21. The high-temperature cooking unit 25 may include a top plate unit or plate 26 and high-temperature heating units or heaters 27. The top plate unit 26 may be provided on the cooktop case 21, for example, on or in the first area 22 to form an exterior of an upper surface of the high-temperature cooking unit 25.

Figure 14:
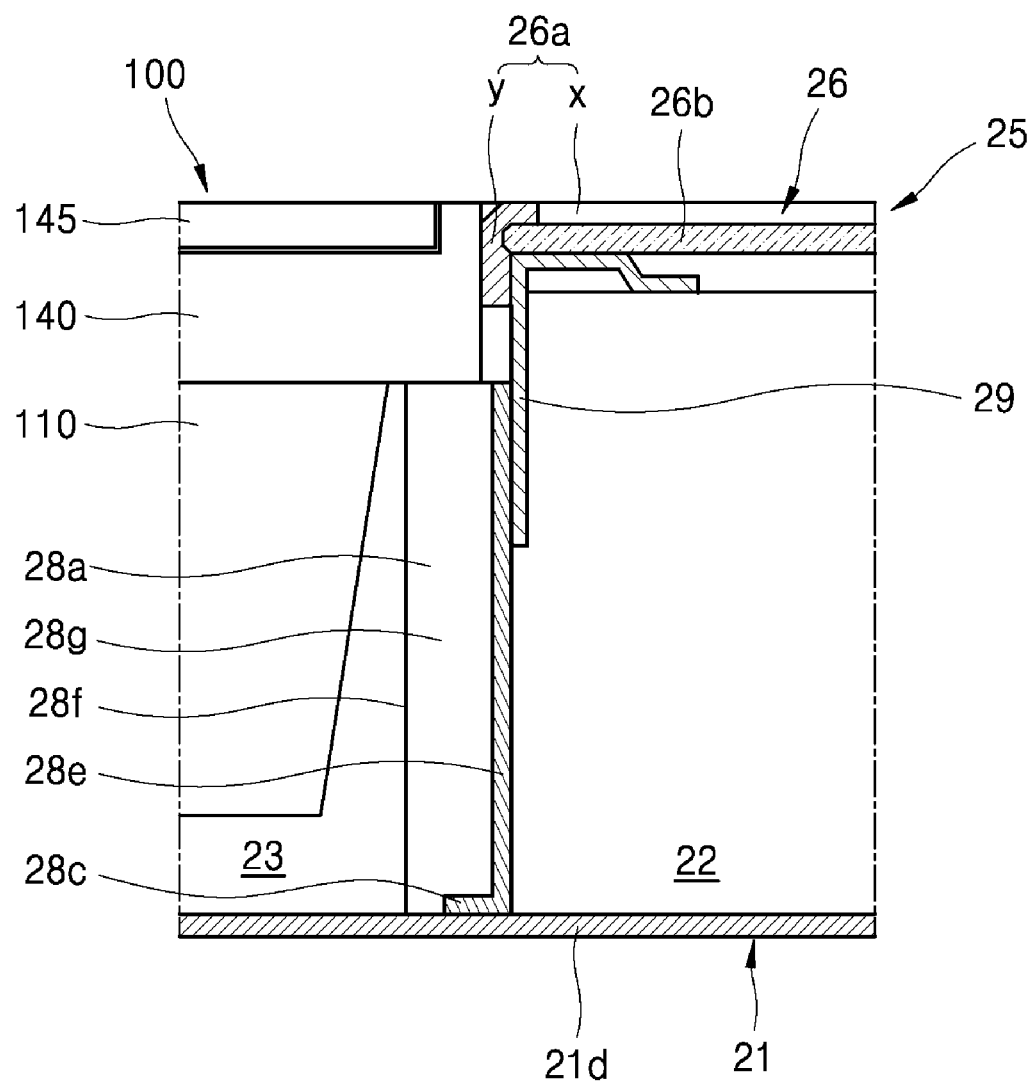
FIG. 14 is a cross-sectional view taken along line XIV-XIV' of FIG. 3.
Figure 15:
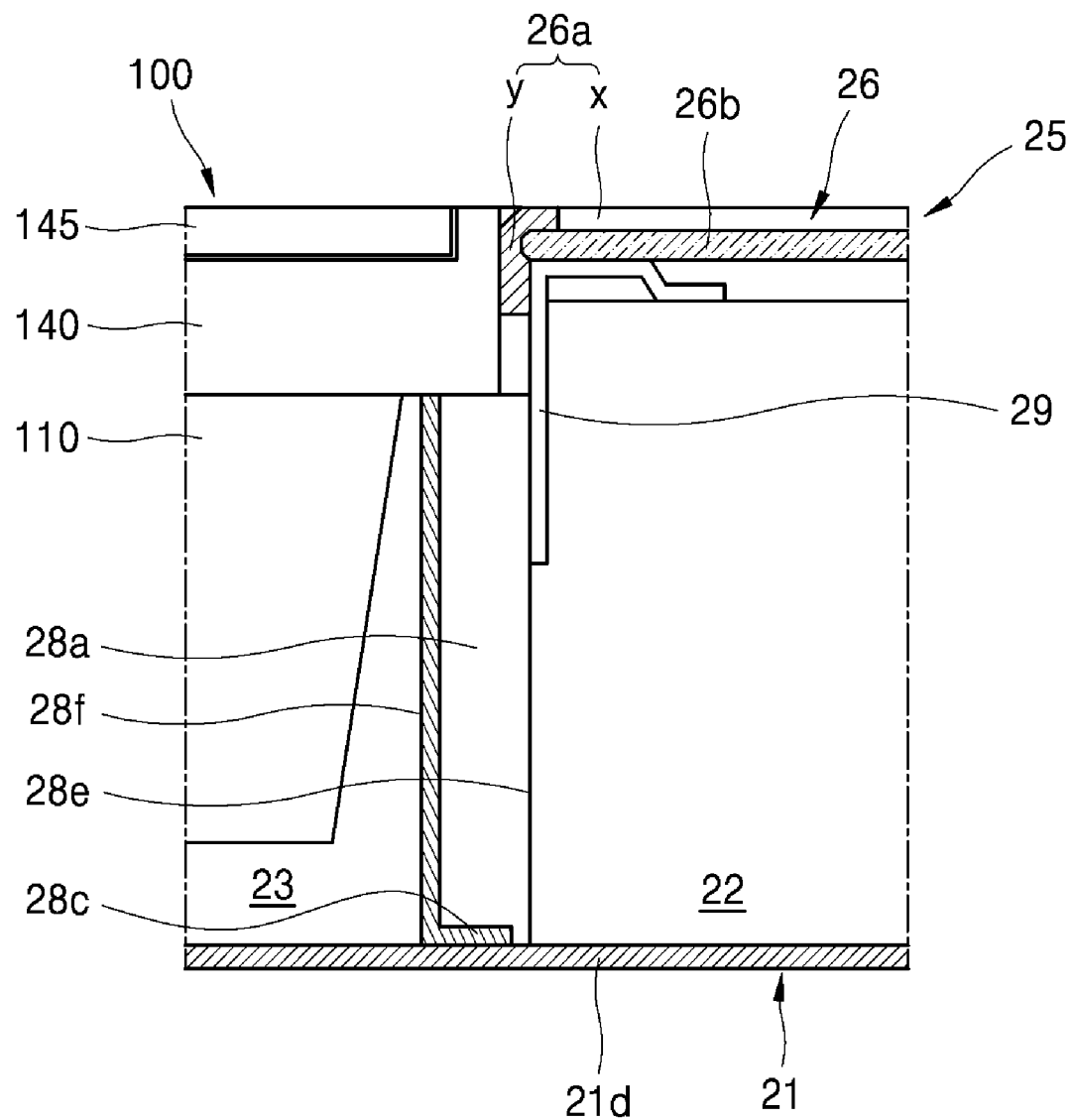
FIG. 15 is a cross-sectional view taken along line XV-XV' of FIG. 3.
Figure 16:
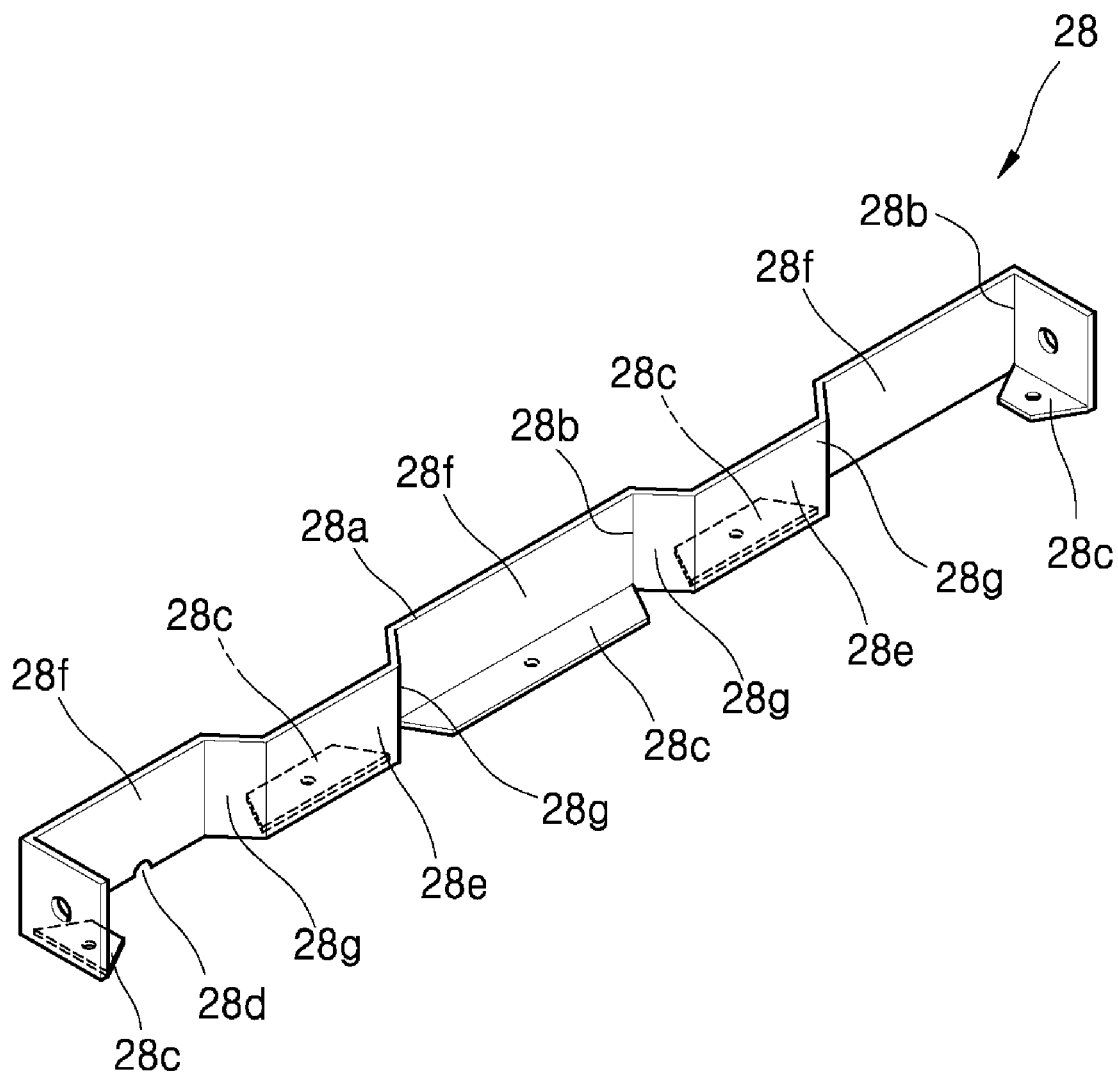
FIG. 16 is a perspective view of a barrier of FIG. 3.

The top plate unit 26 may include a top plate frame 26a and a top plate 26b (see FIG. 14). The top plate frame 26a may form an outer periphery of the top plate unit 26. The top plate frame 26a may have a bent shape with an upper portion x and a side portion y. The upper portion x may have a rectangular shape, and the side portion y may have a shape bent downward from an outer end of the upper portion x.

The top plate 26b may be fitted and fixed in or at the top plate frame 26a. The top plate 26b may provide a surface on which a container for cooking and food may be placed. The top plate 26b may be formed of a ceramic glass and may have a rectangular flat plate shape having a predetermined thickness.

In front of the top plate 26b, an operation display may be provided to identify an operation location of an operation device provided in the cooktop case 21 in order to operate the high-temperature heating units 27. The operation display may be printed on the top plate unit 26 or may be attached as a film. Alternatively, a part or portion of the ceramic glass of the top plate 26b may be made transparent or transflective so that the operation device may be exposed. The operation display may not be seen before it is operated and may be seen when a user touches near it and then a backlight may be turned on under the ceramic glass. A lower surface around the operation display of the top plate 26b may be in contact with the upper surface of the operation unit.

When the top plate 26b is fixed on the cooktop case 21, marks indicating positions of the high-temperature heating units 27 may be provided around each respective high-temperature heating unit 27. Such marks may indicate whether the high-temperature heating units 27 are, for example, a burner, an inverter, or a hot plate.

An edge of the upper surface of the top plate 26b may be tightly fixed to a bottom face of the upper portion x of the top plate frame 26a, and a side surface of the top plate 26b may be tightly fixed to the inner surface of the low-temperature cooking unit 100 of the top plate frame 26a. They may be attached to one another, for example, by injecting a heat-resistant silicone adhesive between the top plate 26b and the top plate frame 26a.

A connecting bracket that conforms to a side surface 21a, a front surface 21b, and a rear surface 21c of the cooktop case 21 may be fixed to a bottom face of the top plate unit 26, such that the top plate unit 26 may be fixed to the cooktop case 21 by fixing or attaching the connecting bracket to the side surface 21a, the front surface 21b, and the rear surface 21c of the cooktop case 21.

The high-temperature heating unit 27 may be provided in the inner space of the cooktop case 21, for example, in an internal space corresponding to the first area 22 of the cooktop case 21. At least one high-temperature heating unit 27 may be installed in the inner space of the cooktop case 21.

The high-temperature heating unit 27 may include an induction heating unit or heater that applies a current to a magnetic coil to generate a vortex current and heats the container to cook the food, or a radiant heating unit or heater that cooks the food with radiation heat from a heating coil. The high-temperature heating unit 27 may include a hidden radiant burner that heats the top plate 26b with a ceramic uniform burner that uses energy generated by burning gaseous fuel, which may be in a form of radiation energy instead of direct fire.

Referring to FIG. 4 to FIG. 7, the low-temperature cooking unit 100 may be installed in the cooktop case 21 and may be accommodated in the cooktop case 21 so as to be located in the second area 23. The low-temperature cooking unit 100 may be provided adjacent to the high-temperature cooking unit 25 in a lateral or first direction and may include a housing 110, a first container 114, a second container 120, a heating unit or heater 130, a cover mount 140, a cover 145, and a vacuum-packing module 150.

The housing 110 may be formed in a rectangular frame shape having a mounting hole 110a therein. An upper periphery of the housing 110 may include bent extensions 112 and 113 that protrude outward from the housing 110 to form a coupling surface that couples with the cover mount 140 on an upper area of the housing 110. The bent extensions 112 and 113 may include a horizontal or first extension 112 that may be bent outward from the upper periphery of the housing 110 and may be extended, and a vertical or second extension 113 that may be bent downward from the horizontal extension 112 and may be extended. The bent extensions 112 and 113 may be formed throughout an entire upper periphery of the housing 110 including a vacuum-packing module mount 115 as well as a container mount 111.

The housing 110 may include the container mount 111 and the vacuum-packing module mount 115. The container mount 111 may be a portion of the housing 110 where the first container 114 and the second container 120 may be placed. The container mount 111 may be located at a rear side of the housing 110 when the housing 110 is divided in a frontward-and-rearward or second direction. The container mount 111 may include the mounting hole 110a and a frame surrounding the mounting hole 110a.

On the container mount 111, the first container 114 may be placed. The first container 114 may be formed in a box shape and may be made of, for example, a metal material having an accommodation space formed therein and an open top. The first container 114 may be provided in the housing 110 so that the second container 120 may be accommodated. The first container 114 may be formed in a hexahedron-like box shape having a width increasing toward the top, the accommodating space therein, and an open top.

The vacuum-packing module mount 115 may be located at a front of the housing 110 when the housing 110 is divided in the frontward-and-rearward or second direction. The vacuum-packing module mount 115 may include the mounting hole 110a and a frame that surrounds the mounting hole 110a and may be formed in a rectangular frame shape connected to the container mount 111. The vacuum-packing module mount 115 may be a portion of the housing 110 where the vacuum-packing module 150 is mounted. The vacuum-packing module mount 115 may be formed in the shape of a polygonal frame that protrudes forward from the container mount 111 and may have a bottom face higher than a bottom face of the first container 114. An electronic device space a may be formed below the vacuum-packing module mount 115.

The container mount 111 and the vacuum-packing module mount 115 of the housing 110 may be integrally connected to each other. The second container 120 and the heating unit 130 may be mounted on the container mount 111, and the vacuum-packing module 150 may be mounted on the vacuum-packing module mount 115. Accordingly, the low-temperature cooking unit 100 may include such a configuration for cooking food at a low temperature as well as a configuration for vacuum-packing the food.

The second container 120 may accommodate a liquid, such as, for example, water therein and may be inserted into and taken out of the first container 114. The second container 120 may include a container body 121, a container cover 123, and handles 125, as shown in FIG. 6 to FIG. 9. The container body 121 may have an accommodating space therein and may be formed in a box shape. The second container 120 may be formed in a box shape similar to a shape of the first container 114 but may be smaller in height. The container body 121 may be made of, for example, a metal material having a high thermal conductivity.

The container cover 123 may be provided in the form of a rectangular plate that covers an open top of the container body 121 and may be seated on an upper portion of the second container 120 to cover the open top of the second container 120. The container cover 123 may prevent steam generated when water or liquid inside the second container 120 is heated from leaking out of the second container 120 and may block heat transfer to the cover 145, to thereby prevent overheating of the cover 145, such that overflow of the water or liquid when the second container 120 is moved may be prevented. A gasket g may seal an area between the container cover 123 and the container body 121 so as to enhance the sealing between the container cover 123 and the container body 121.

The handles 125 may be provided on sides of the container body 121 such that they may be able to pop up and down in a vertical or third direction. A flange that protrudes in the lateral or first direction may be formed on an upper end portion or end of the container body 121, and the handles 125, having a square ring shape, may be coupled with the flange such that they may slide in the vertical or third direction.

The handles 125 may be coupled with the sides of the container such that they may move between positions, for example, a hidden position (see FIG. 8) where the handles 125 are located inside the first container 114 so that they do not protrude from the housing 110, and a protruding position (see FIG. 9) where the handles 125 protrude upwardly from the first container 114. The handles 125 may protrude in the protruding position by a length that a user may be able to hold the handles 125 from an outside of the first container 114 to lift up the second container 120 mounted in the first container 114.

By installing the handles 125 on the container body 121 instead of the container cover 123 as described above, it may not be necessary to add an element to fix the container cover 123 to the container body 121 firmly, such as a buckle, such that a configuration of the second container 120 may be simpler. The handles 125 may pop up and down in the vertical or third direction such that a volume occupied by the handles 125 in the second container may be reduced. Accordingly, a volume of the first container 114 required to accommodate the second container 120 may be reduced, and thus, sizes of the housing 110 and the first container 114 and in turn an overall size of the cooking appliance may be reduced.

Referring to FIG. 4 to FIG. 7, the heating unit 130 may be installed in the housing 110 and may heat liquid in the second container 120. The heating unit 130 may be implemented as a low-temperature heating unit to heat liquid contained in the first container 114 and the inside of the second container 120, to a temperature of about 100° C. or lower.

The heating unit 130 may include an electric heater 131 in a plate-like shape installed on a bottom of the first container 114 such that it may be located on a bottom face of the second container 120 mounted in the first container 114. The electric heater 131 may come in contact with the bottom face of the container body 121 and may heat the water or liquid contained in the second container 120.

As another example, the heating unit 130 may be installed such that it may come in contact with another portion than the bottom face of the container body 121, may include a coil heater, may include other heating devices than the electric heater, for example, a heating device that heats the second container 120 via induction heating, or other heating methods. Other modifications are also possible.

The heating unit 130 may further include a temperature sensor 133 and a heating temperature adjuster 135. The temperature sensor 133 may sense a temperature of the second container 120 heated by the electric heater 131 or a temperature of the water or liquid contained in the second container 120. The heating temperature adjuster 135 may control operation of the electric heater 131 so that the temperature of the second container 120 or the temperature of the water or liquid contained in the second container 120 may be maintained at a predetermined temperature. The temperature sensor 133 may include a thermistor, and the heating temperature adjuster 135 may include a thermostat.

The cover mount 140 may have a shape of a rectangular frame conforming to a shape of an upper periphery of the housing 110 and may be installed on the housing 110. An opening hole 141 may be formed through the cover mount 140, via which the second container 120 accommodated in the first container 114 and the vacuum-packing module 150 may be exposed. The cover mount 140 may be installed on the housing 110 by being coupled to the bent extensions 112 and 113 formed on the upper periphery of the housing 110. The cover mount 140 may couple the cover 145 to the housing 110.

The cover 145 may be installed on the cover mount 140 to open and close the opening hole 141. The cover 145 may include a cover glass 146 and a cover plate 147. The cover glass 146 may be formed in a rectangular plate shape capable of covering the opening hole 141, and may be formed of, for example, a transparent or transflective glass or plastic material. The cover plate 147 may be formed in a rectangular plate shape conforming to the shape of the cover glass 146 and may be coupled under the cover glass 146 to support the cover glass 146. A window w may be formed on an inner side of the cover plate 147 by penetrating it in the vertical or third direction, and cooking completion of the low-temperature cooking unit 100 covered by the cover 145 may be checked from an outside via the window w.

An end of the cover 145 may be rotatably coupled to the cover mount 140 and may pivot about the end so as to open and close the opening hole 141. For example, an end of the cover 145 may be pivotally coupled to a hinge 149 provided on the cover mount 140 in the vertical or third direction, and the cover 145 may rotate in the vertical or third direction about the end to thereby open and close the opening hole 141.

An opposite end of the cover 145 may include a protruding hook member or hook h to secure the opposite end of the cover 145 to the housing 110 or the cover mount 140. A latch mechanism r that detachably couples with the hook h may be provided at a counterpart or corresponding position of the housing 110 or the cover mount 140. The hook h may be coupled with and decoupled from the latch mechanism r sequentially by repeatedly pressing the opposite end of the cover 145 where the hook h is installed. In this manner, the cover 145 may be pivoted about the end rotatably coupled to the hinge 149 to open and close the opening hole 141 while the opposite end of the cover 145 is secured to the housing 110 or the cover mount 140 by the coupling between the hook h and the latch mechanism r, so that it may be possible to stably maintain closure of the housing 110 or the cover mount 140.

As the cover 145 is opened and closed, elements or components, such as the second container 120 and the vacuum-packing module 150 mounted on the housing 110, may be either exposed to the outside or may be covered by the cover 145. A gasket g may seal the area between the cover 145 and the cover mount 140 so as to enhance the sealing between the cover 145 and the cover mount 140.

The cover 145 may be divided into a pressing area 145*a* and a covering area 145*b*. The pressing area 145*a* may be a region where the cover 145 faces the vacuum-packing module 150 when the cover 145 closes the opening hole 141, and the cover 145 covers the vacuum-packing module 150 from above and presses it down. The covering area 145*b* may be a region where the cover 145 faces the first container 114 and the second container 120 when the cover 145 closes the opening hole 141, and the cover 145 covers the open top of the first container 114.

A top surface of the cover 145 may be flush with a top surface of the top plate unit 26 when the cover 145 is closed, as shown in FIG. 1. Thus, a top surface of the cooking appliance may be smoothly connected across the high-temperature cooking unit 25 and the low-temperature cooking unit 100, and it may be easy to clean the top surface.

Figure 5:
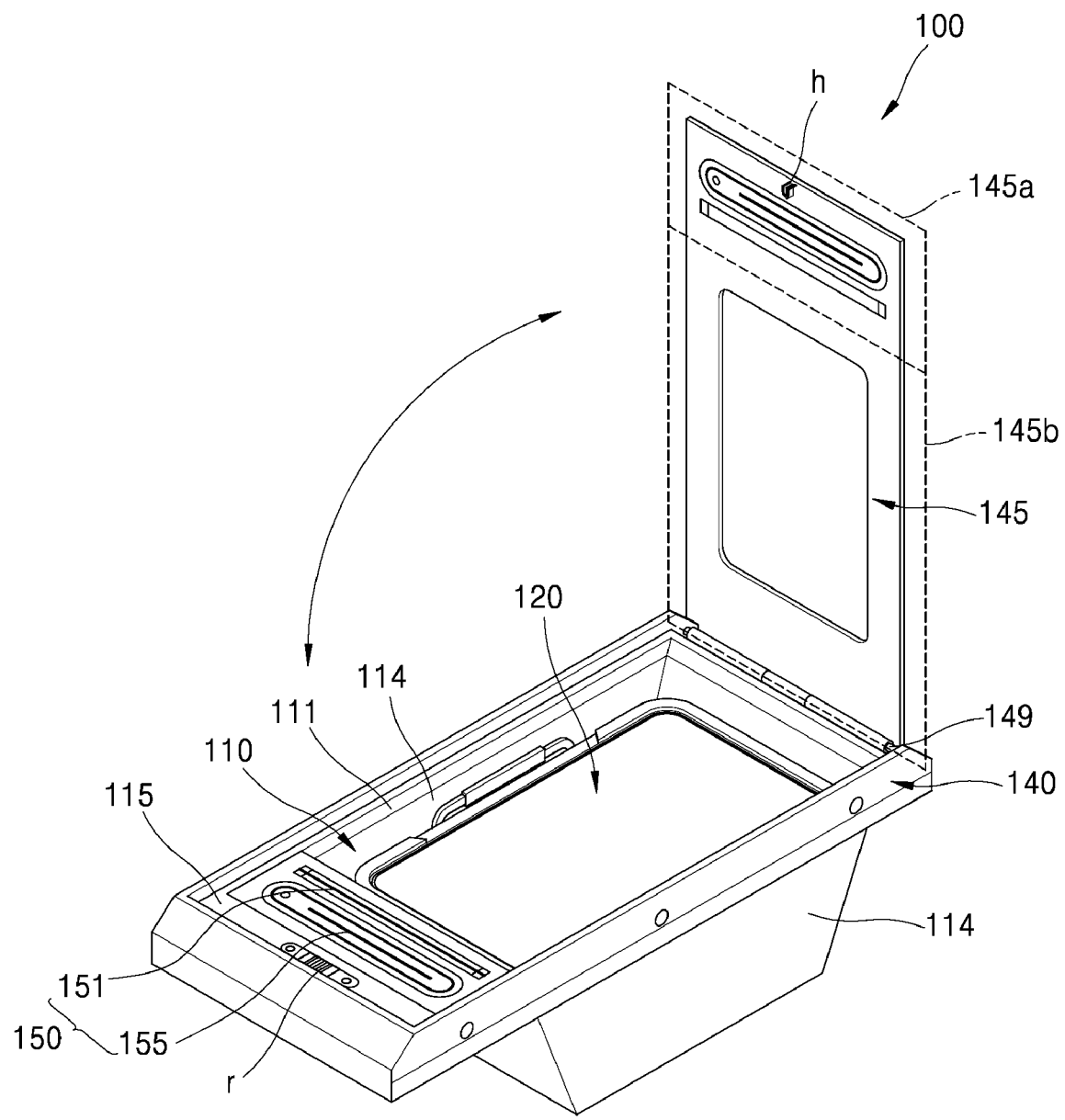
FIG. 5 is a perspective view showing the low-temperature cooking unit of FIG. 4 with an opened cover.
Figure 6:
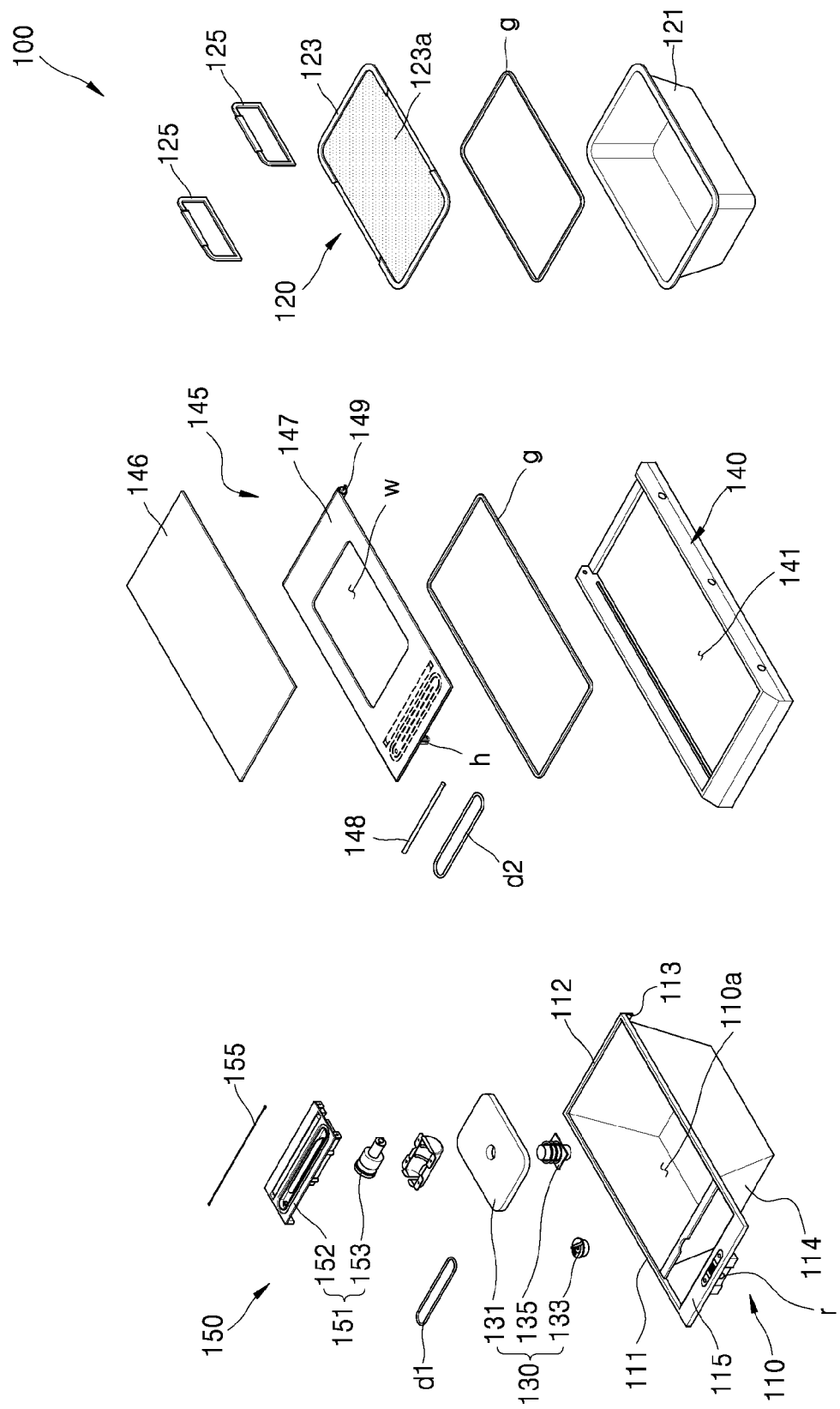
FIG. 6 is an exploded, perspective view of a low-temperature cooking unit according to an embodiment.
Figure 7:
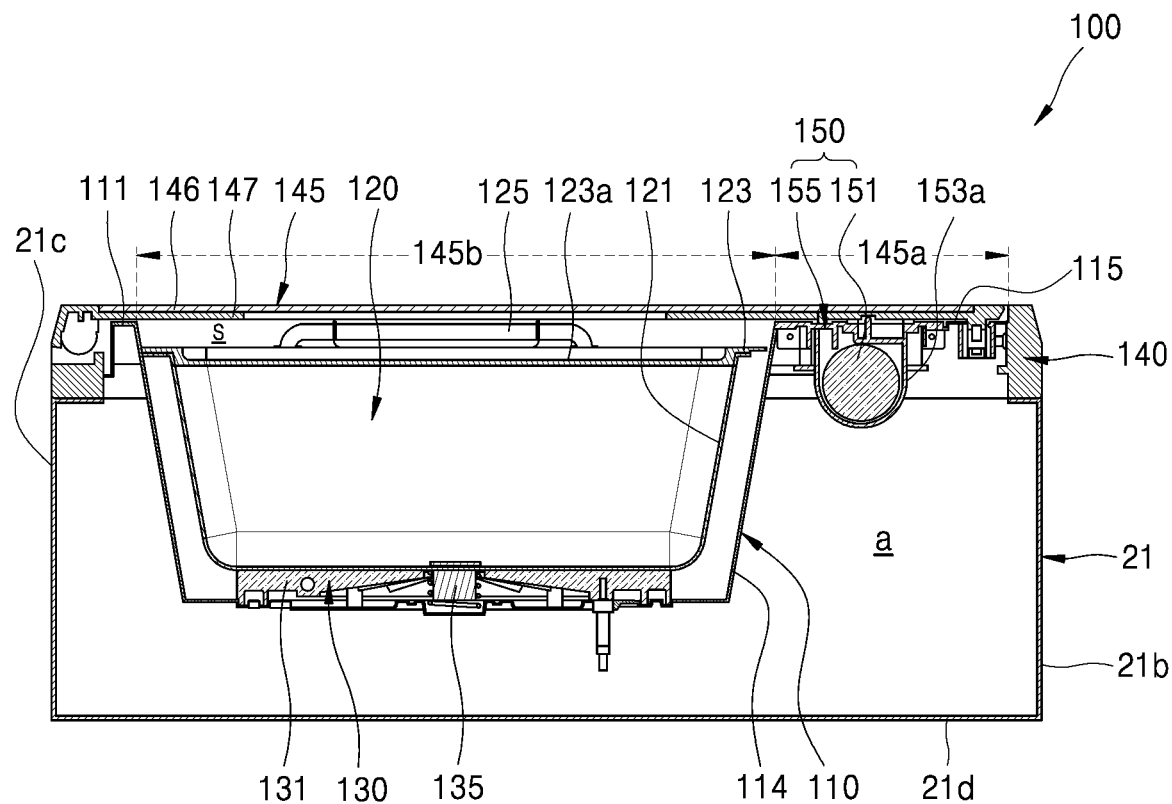
FIG. 7 is a cross-sectional view taken along line VII-VII' of FIG. 4.
Figure 8:
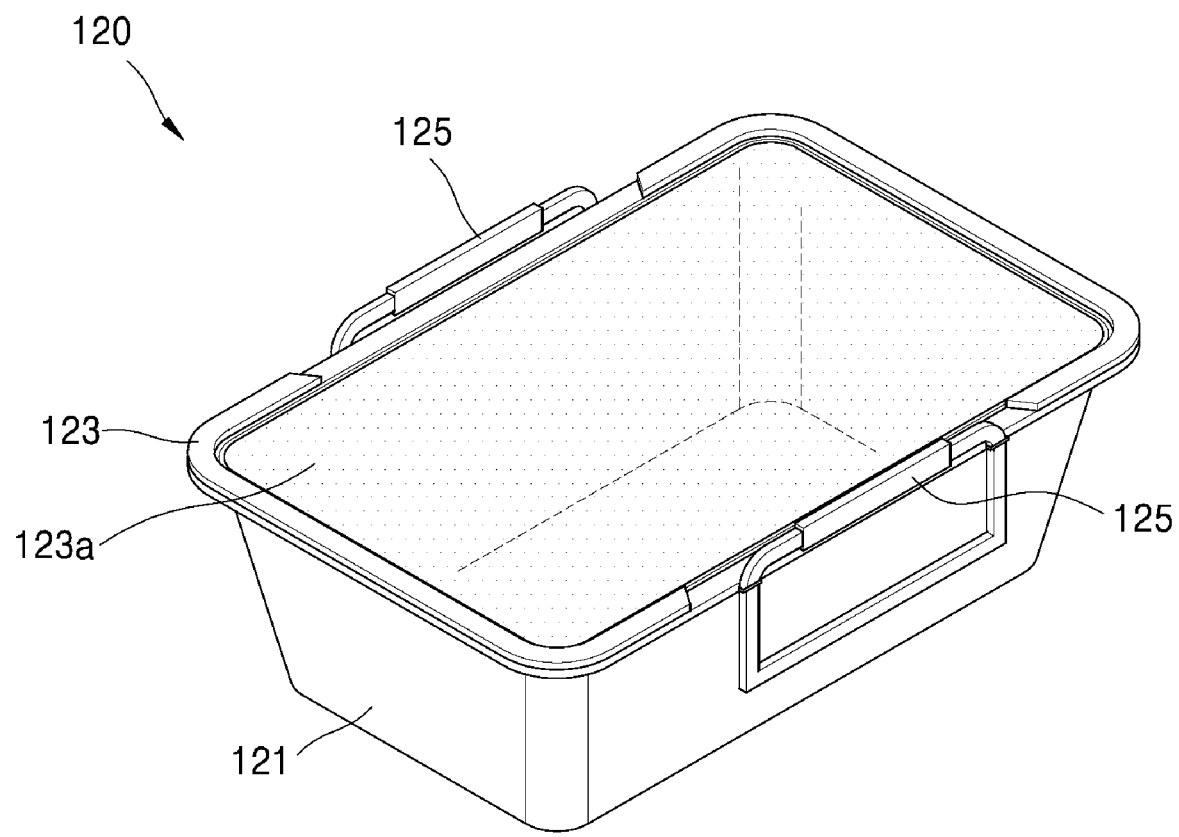
FIG. 8 is a perspective view of a container according to an embodiment.
Figure 9:
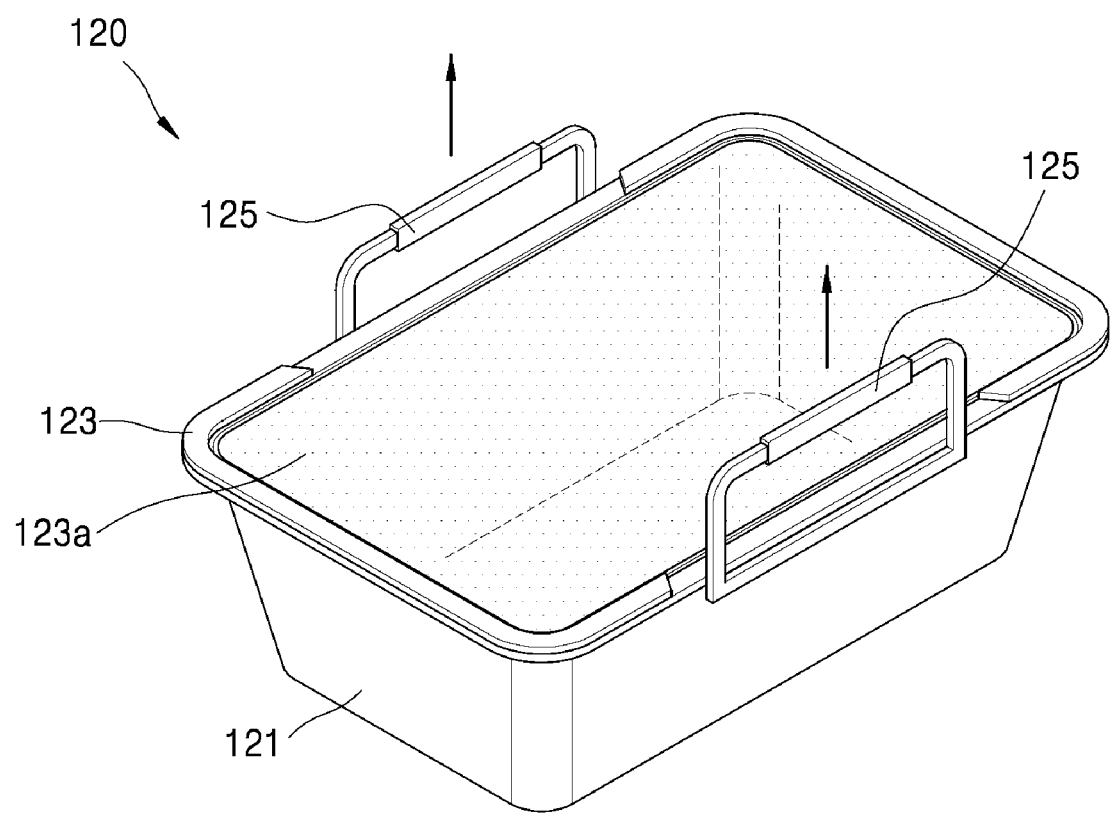
FIG. 9 is a perspective view of the container of FIG. 8 with handles popped up.
Figure 10:
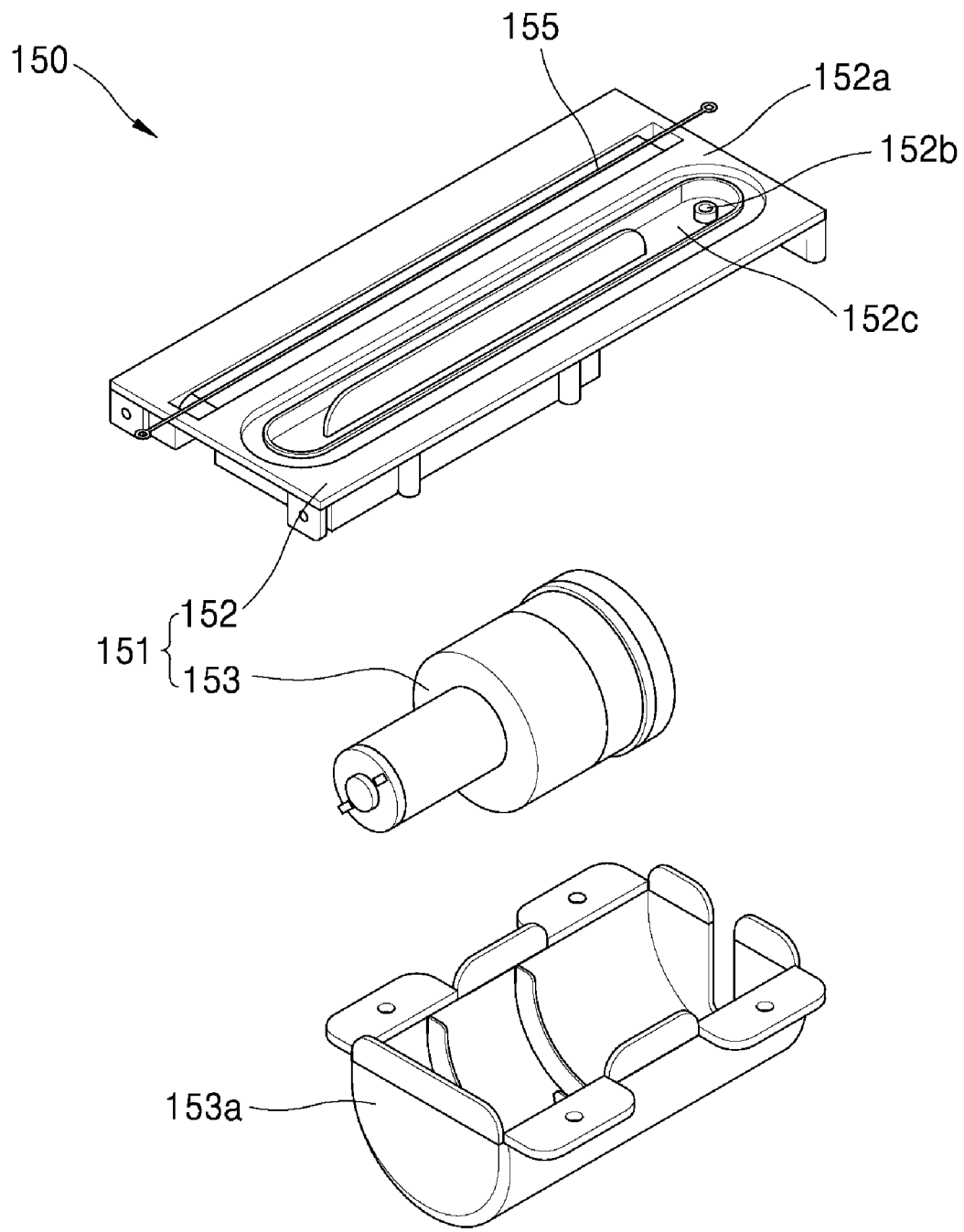
FIG. 10 is an exploded perspective view of components of a vacuum packing module according to an embodiment.
Figure 11:
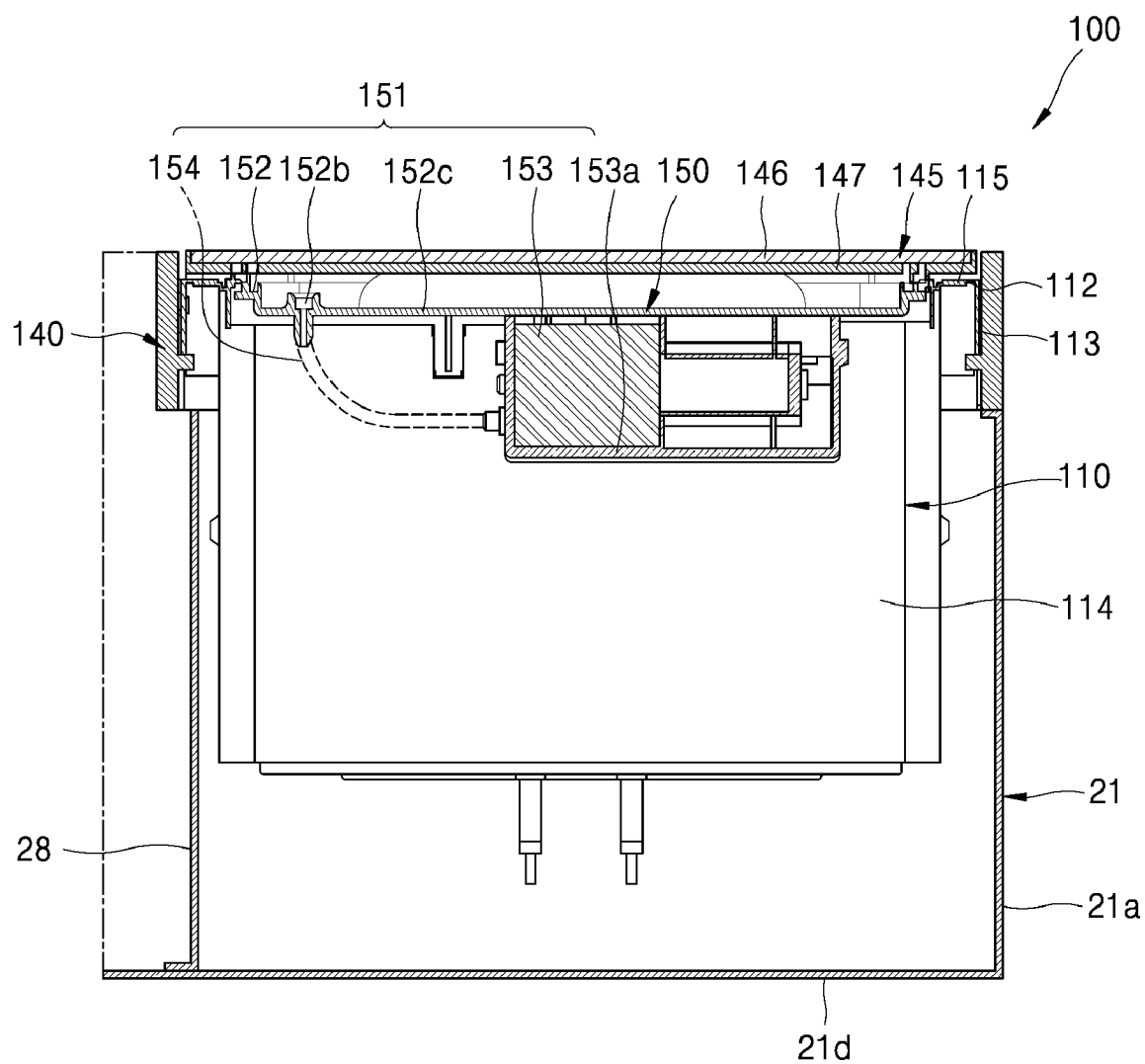
FIG. 11 is a cross-sectional view taken along line XI-XI' of FIG. 4.

Referring to FIG. 5 to FIG. 7, the vacuum-packing module 150 may be installed in the vacuum-packing module mount 115. The vacuum-packing module 150 may include a vacuum pressure generator 151 that generates a vacuum pressure to make an inside of a food packing bag p (see FIG. 12) be in a vacuum state, and a sealing heater or sealer 155 that generates heat to seal an opening of the food packing bag p.

The vacuum pressure generator 151 may allow the inside of the food packing bag p to be cooked in the vacuum state and may include a vacuum panel 152 and a vacuum pump 153, as shown in FIG. 10 to FIG. 13. The vacuum panel 152 may include a frame in which a variety of components of the vacuum-packing module 150 may be installed, and a supporting surface 152a that supports a portion of the food packing bag p, which may be vacuum-packed by the vacuum-packing module 150. The vacuum panel 152 may be formed in a shape of a rectangular plate that may cover the penetrated inside of the vacuum-packing module mount 115 formed in the shape of a rectangular frame. The vacuum panel 152 may have an air suction port 152b, and a packing bag slot 152c.

The air suction port 152b may be formed by penetrating the vacuum panel 152. A protrusion that protrudes downward to surround the air suction port 152b may be formed on a lower surface of the vacuum panel 152 where the air suction port 152b is formed. The protrusion may be coupled with a connecting hose 154 that connects the vacuum pump 153 to the air suction port 152b.

The packing bag slot 152c may form a concave surface into which an opening of a food packing bag p may be inserted. The packing bag slot 152c may have a concave surface facing downward from the supporting surface 152a formed by the vacuum panel 152. An insertion space surrounded by side surfaces connecting the packing bag slot 152c and the supporting surface 152a may be formed in the portion where the packing bag slot 152c is formed. The opening of the food packing bag p may be accommodated in the insertion space. The air suction port 152b may be formed by penetrating the packing bag slot 152c so that it may be located in the insertion space.

The vacuum pump 153 may generate a vacuum pressure acting on the air suction port 152b and may be installed under the vacuum panel 152. A pump case 153a may be coupled under the vacuum panel 152 while the vacuum pump 153 may be accommodated in the pump case 153a coupled under the vacuum panel 152, such that the vacuum pump 153 may be installed. The vacuum pump 153 may be connected to the air suction port 152b through the connecting hose 154. Vacuum pressure generated by operation of the vacuum pump 153 may act via the air suction port 152b connected to the connecting hose.

A first seal d1 may be installed to surround the packing bag slot 152c in the vacuum panel 152 where the vacuum pump 153 is installed. The first seal d1 may be formed in a closed curve shape surrounding the packing bag slot 152c and the air suction port 152b formed in the packing bag slot 152c. In the pressing area 145a of the cover 145 facing the vacuum-packing module 150, a second seal d2 having a shape conforming to the first seal d1 may be installed. The second seal d2 may engage with the first seal d1 so that the insertion space in the packing bag slot 152c may be sealed when the cover 145 closes the opening hole 141.

The first seal d1 and/or the second seal d2 may be made of, for example, a buffer material. As the first seal d1 and the second seal d2 are engaged with each other, the insertion space inside the packing bag slot 152c may be sealed. By doing so, the vacuum pressure acting via the air suction port 152b may effectively act on the opening of the food packing bag p accommodated in the insertion space.

The sealing heater 155 may generate heat to seal the opening of the food packing bag p and may include a hot wire that generates heat by electric current. The hot wire of the sealing heater 155 may be a straight line in parallel to the packing bag slot 152c provided in the vacuum panel 152 and may have a length equal to a length of the packing bag slot 152c. The hot wire may be spaced apart from the packing bag slot 152c by a predetermined distance in the frontward-and-rearward or second direction. The hot wire may be installed on the supporting face 152a of the vacuum panel 152 and may be exposed to the top of the vacuum panel 152. The hot wire of the sealing heater 155 may be provided between the packing bag slot 152c of the vacuum pressure generator 151 and the first container 114.

In addition, a pressing member or presser 148 may be provided in the pressing area 145a of the cover 145 facing the vacuum-packing module 150. The presser 148 may come into contact with the hot wire of the sealing heater 155 when the cover 145 closes the opening hole 141, and may have a width larger than a width of the hot wire of the sealing heater 155 and may be a pad made of, for example, a buffer material. The presser 148 may press the opening of the food packing bag p located on the sealing heater 155 toward the hot wire, so that the food packing bag p may be more effectively sealed by the hot wire.

The pressing area 145a of the cover 145 where the first seal d1 and the presser 148 are installed may cover the vacuum-packing module 150 when the cover 145 closes the opening hole 141, such that the first seal d1 may be engaged with the second seal d2 and the presser 148 may be in contact with the hot wire of the sealing heater 155, to cover the vacuum generator 151 and the sealing heater 155 of the vacuum-packing module 150. When the pressing area 145a covers the vacuum pressure generator 151 and the sealing heater 155 of the vacuum packaging module 150 as described above, the opening of the food packing bag p inserted into the packing bag slot 152 may be fixed in the space sealed by the first seal d1 and the first seal d2 engaged with each other while being pressed toward the hot wire of the sealing heater 155 by the presser 148, so that the opening remains in close contact with the hot wire of the sealing heater 155.

Figure 12:
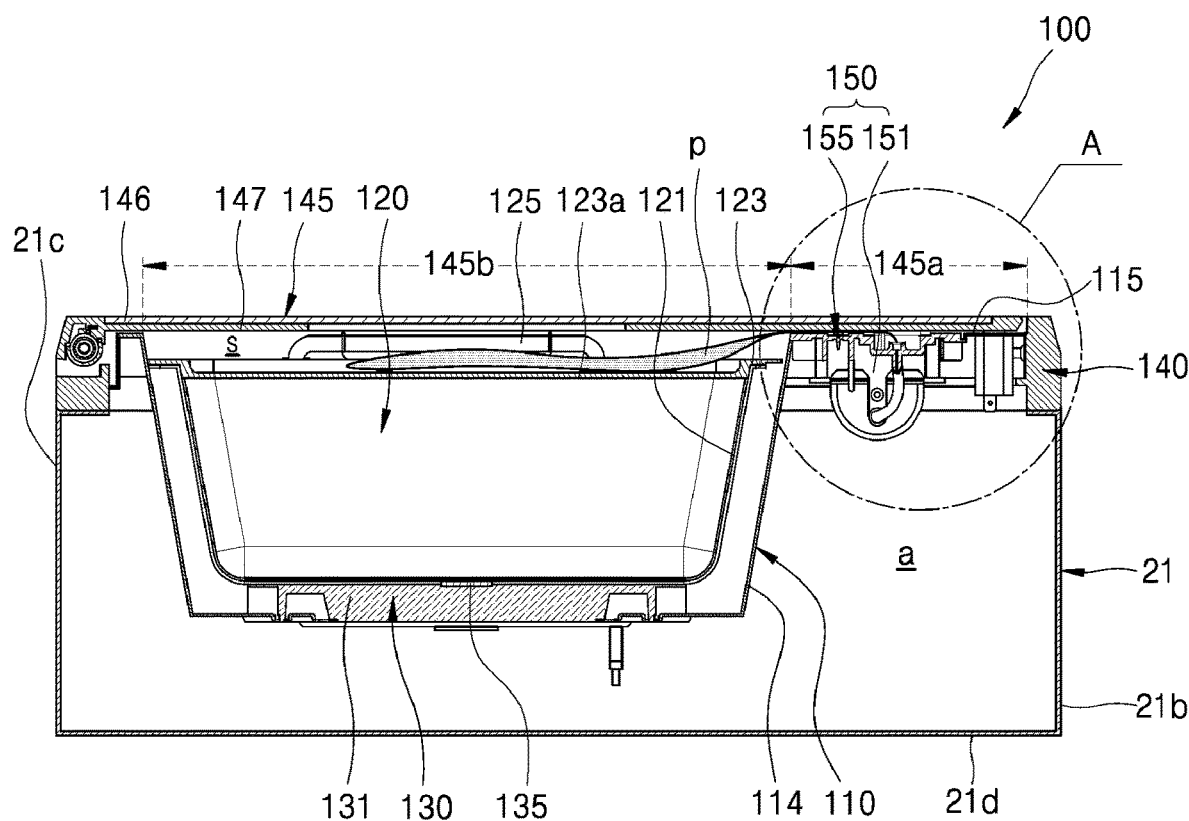
FIG. 12 is a cross-sectional view taken along line XII-XII' of FIG. 4.

Referring to FIG. 12, the container cover 123 of the second container 120 mounted on the first container 114 may include a seating surface 123a formed on the upper surface thereof. The seating surface 123a may be depressed from a periphery of the container cover 123 so as to form a plane lower than a plane defined by the supporting surface 152a of the vacuum panel 152 and the plane defined by the packing bag slot 152c.

The seating surface 123a may form a plane on which the rest of the food packing bag p having its opening inserted into the packing bag slot 152c of the vacuum panel 152, that is, a portion accommodating the food therein may be seated. The seating surface 123a may form the plane lower than the plane defined by the supporting surface 152a of the vacuum panel 152 and the plane defined by the packing bag slot 152c, such that the plane may be spaced apart from the plane defined by the covering area 145b of the cover 145 downwardly when the opening hole 141 is closed. Accordingly, the space s for accommodating the food packing bag p may be formed between the covering area 145b of the cover 145 and the seating surface 123a when the cover 145 closes the opening hole 141.

Figure 13:
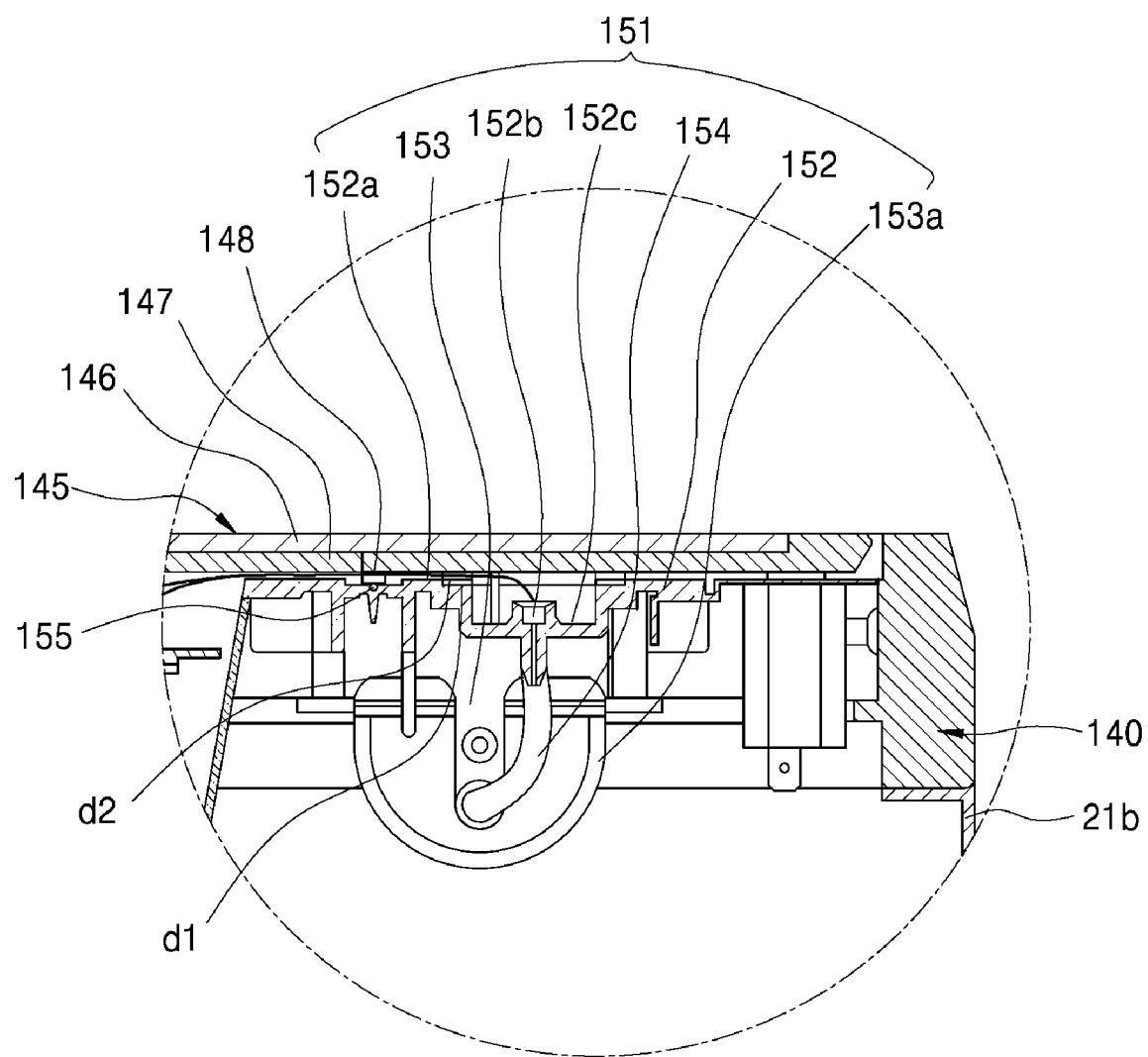
FIG. 13 is an enlarged view of a portion A of FIG. 12.

Referring to FIG. 3, FIG. 7 and FIG. 13, the low-temperature cooking unit 100 having the above-described configuration may be accommodated in the cooktop case 21, such that it may be accommodated in the second area 23 surrounded by the side surface 21a, the front surface 21b, and the barrier 28. As described above, the vacuum-packing module mount 115 of the housing 110 accommodated in the second area 23 may be provided at a portion protruding forward from the container mount 111 and the first container 114, with a bottom face higher than a bottom face of the first container 114. Under the vacuum-packing module mount 115, the electronic device space a may be formed. The electronic device space a may be a region located at a front of the container mount 111 and the first container 114, and may include a region located lower than the vacuum-packing module 150 mounted on the vacuum-packing module mount 115.

The cooktop case 21 may form a space to accommodate the housing 110 and the electronic device space a. The cooktop case 21 and the barrier 28 may define an outer boundary of the electronic device space a. For example, an upper boundary of the electronic device space a may be defined by the vacuum-packing module 150, a part or portion of one of four side boundaries of the electronic device space a may be defined by the first container 114, and a lower boundary and three side boundaries of the electronic device space a may be defined by the barrier 28, the side surface 21a, the front surface 21b, and a bottom surface 21d of the cooktop case 21, respectively.

The first container 114 may have a shape having a length in the vertical or third direction at least longer than a length in the vertical or third direction of the second container 120 to accommodate the second container 120. The vacuum-packing module mount 115 and the vacuum-packing module 150 may not need to accommodate a large component, such as the second container 120, and thus, may not need to have a length equal to that of the first container 114 in the vertical or third direction. Therefore, there may be a free space where no component directly associated with the vacuum-packing module 150 may be provided under the vacuum-packing module mount 115 and the vacuum-packing module 150. The space obtained at a left or lateral front side in the cooktop case 21 may be the electronic device space a.

The electronic device space a may accommodate, for example, a component associated with operation of the heating unit 130, a component associated with operation of the vacuum-packing module 150, a component associated with a connection therebetween, and a component associated with supplying electricity. In the electronic device space a, for example, a component, such as a cooling fan that cools down electronic components installed in the electronic device space a, an electronic component associated with operation of the high-temperature cooking unit 25, or an electronic component associated with the control panel 51 may be installed (see FIG. 1).

Referring to FIG. 3 and FIG. 14 to FIG. 16, the internal space of the cooktop case 21 in which the high-temperature cooking unit 25 and the low-temperature cooking unit 100 may be installed may be divided into the first area 22 for the high-temperature cooking unit 25 and the second area 23 for the low-temperature cooking unit 100 by the barrier 28. The barrier 28 may separate spaces that employ different heating methods or that need to be cooled down separately. The barrier 28 may be in the form of a plate that extends upward from the bottom surface 21d of the cooktop case 21 and may be fixed to, for example, the side surface 21a, or the rear surface 21c, as desired. For example, the barrier 28 may be produced by bending a metal plate.

A flat metal plate may be cut to form a diaphragm 28a. The diaphragm 28a may have a height extending upward from the bottom surface 21d of the cooktop case 21 and a length extending from the front surface 21b to the rear surface 21c of the cooktop case 21. Subsequently, the diaphragm 28a may be bent at predetermined positions so that it may conform to a boundary of the internal space of the cooktop case 21 to be separated, to form bent portions 28b. Fixing surfaces 28c at a lower end of the diaphragm 28a may also be produced by bending it. Locations and a number of the fixing surfaces 28c may be determined depending on a shape of the diaphragm 28a according to locations of the bent portions 28b. A passage groove 28d may be formed at a predetermined position of the diaphragm 28a of the barrier 28 so as to provide a space through which an element may pass across the spaces.

The barrier 28 may be fastened and fixed to the bottom surface 21d of the cooktop case 21 by the fixing surface 28c so that the diaphragm 28a may be fixed on the bottom surface 21d. As the diaphragm 28a is bent at several positions along a longitudinal or fourth direction thereof, it may have higher rigidity than a diaphragm in the form of a straight line with respect to a load applied thereto. As described above, as the barrier 28 has the bent portions 28b at predetermined positions of the metal plate extended in the longitudinal or fourth direction and the fixing surfaces 28c, it may be easy to produce, may be convenient to install in the cooktop case 21, and may achieve high rigidity after it is installed in the case.

In the first area 22 in which the high-temperature cooking unit 25 is installed, a heat higher than that of the second area 23 in which the low-temperature cooking unit 100 is installed may be generated due to the high-temperature heating unit 27. If the heat generated in the high-temperature cooking unit 25 is transferred to the low-temperature cooking unit 100 such that a temperature of the low-temperature cooking unit 100 is raised, there may be an error in the temperature measured by the temperature sensor 133 (see FIG. 6). As a result, it may be difficult to accurately measure the temperature of the second container 120 or the temperature of the water or liquid contained in the second container 120 heated by the low-temperature cooking unit 100.

In order to solve this problem, according to an embodiment, the barrier 28 may be installed between the first area 22 in which the high-temperature cooking unit 25 is installed and the second area in which the low-temperature cooking unit 100 is installed, to separate them. By doing so, it may be possible to block the heat generated in the high-temperature cooking unit 25 from being transferred to the low-temperature cooking unit 100, allowing the temperature of the low-temperature cooking unit 100 to be controlled accurately and food to be heated at a low or desired temperature.

A right or first side of the top plate unit 26 may be coupled with and fixed to the side surface 21a of the cooktop case 21 via a connecting bracket, while a left or second side of the top plate unit 26 closer to the low-temperature cooking unit 100 may not be coupled with the side surface 21a of the cooktop case 21. As a result, the left side of the top plate unit 26 may sag at a boundary between the high-temperature cooking unit 25 and the low-temperature cooking unit 100.

In addition, the left side of the low-temperature cooking unit 100 may be fixed to the cooktop case 21 via the coupling between the housing 110 and the side surface 21a of the cooktop case 21, while the right side of the low-temperature cooking unit 100 closer to the high-temperature cooking unit 25 may not be coupled with the side surface 21a of the cooktop case 21. As a result, the right side of the low-temperature cooking unit 100 may sag at the boundary between the high-temperature cooking unit 25 and the low-temperature cooking unit 100 or the low-temperature cooking unit 100 may be detached from the high-temperature cooking unit 25.

To solve this problem, the barrier 28 may have a support structure that supports the left side of the top plate unit 26 and supports the right side of the low-temperature cooking unit 100. The diaphragm 28a of the barrier 28 may include first projecting surface portions or surfaces 28e which may form planes in the vertical or third direction that protrude toward the first area 22, second projecting surface portions or surfaces 28f which may form planes in the vertical or third direction that protrude toward the second area 23, and connecting surface portions or surfaces 28g that connect the first projecting surface portions 28e with the second projecting surface portions 28f. That is, the diaphragm 28a may have a shape in which the first projecting surface portions 28e, the connecting surface portions 28g, and the second projecting surface portions 28f are connected with one another along the longitudinal or fourth direction of the diaphragm 28a, with the bent portion 28b between the first projecting surface portions 283 and the connecting surface portions 28g and between the connecting surface portions 28g and the second projecting surface portions 28f.

As the diaphragm 28a thus formed is bent at several positions along the longitudinal or fourth direction thereof, the diaphragm 28a may have a higher rigidity than a diaphragm in the form of a straight line with respect to a load applied thereto. Further, it may provide a support structure that supports the left side of the top plate unit 26 and supports the right side of the low-temperature cooking unit 100.

The first projecting surface portions 28e of the diaphragm 28a may form the plane in the vertical or third direction protruding toward the first area 22. The first projecting surface portions 28e may be located under the top plate unit 26. One or more the first projecting surface portions 28e may be formed along the longitudinal or fourth direction of the diaphragm 28a. A number and positions of the first projecting surface portions 28e may be determined depending on, for example, a shape and weight of the top plate unit 26.

At least one of the first projecting surface portions 28e may be provided with a top-plate coupler 29 to couple the barrier 28 with the top plate unit 26. The top-plate coupler 29 may be, for example, a metal plate in the shape of ",.". A first side having a planar shape in the vertical or third direction of the top-plate coupler 29 may be coupled to the first projecting surface portions 28e, and a second side having a planar shape in the horizontal direction of the top-plate coupler 29 may be coupled to a bottom face of the top plate unit 26. In this manner, the barrier 28 may be coupled with the top plate unit 26 (see FIG. 15). For example, the barrier 28 may be connected to the first side of the top-plate coupler 29 by, for example, welding or bolt fastening. The second side of the top-plate coupler 29 may be connected to the top plate unit 26 by, for example, injecting a heat-resistant silicone adhesive therebetween to fix them to each other.

The barrier 28 may support the top plate unit 26 in the vertical or third direction using the top-plate coupler 29 coupled between the first projecting surface portions 28e and the top plate unit 26. As the left side of the top plate unit 26 is supported by the supporting structure, it may be possible to prevent the top plate unit 26 from sagging at the left side thereof, that is, at a boundary between the high-temperature cooking unit 25 and the low-temperature cooking unit 100.

The second projecting surface portions 28f of the diaphragm 28a may form a plane in the vertical or third direction that protrudes toward the second area 23. The second projecting surface portions 28f may be located under the bent extensions 112 and 113 of the housing 110 and the cover mount 140 coupled with the bent extensions 112 and 113 (see FIG. 6). One or more of the second projecting surface portions 28f may be formed along the longitudinal or fourth direction of the diaphragm 28a, without overlapping with the first projecting surface portions 28e. A number and positions of the second projecting surface portions 28f may be determined depending on, for example, a shape and weight of the low-temperature cooking unit 100.

At the upper end of the barrier 28, interference may occur between a bottom surface of at least one of the bent extensions 112 and 113 or the cover mount 140 and an upper end of the second projecting surface portions 28f, such that the right side of the low-temperature cooking unit 100 may be supported by the barrier 28 in the vertical or third direction. The right side of the low-temperature cooking unit 100 may be supported by the connecting surface portions 28g connecting between the second projecting surface portions 28f and the first projecting surface portions 28e (see FIG. 16). By the support structure that supports the right side of the low-temperature cooking unit 100 formed by the second projecting surface portions 28f and the connecting surface portions 28g of the barrier 28 as described above, it may be possible to prevent the low-temperature cooking unit 100 from sagging or from being detached from the high-temperature cooking unit 25 at the boundary between the low-temperature cooking unit 100 and the high-temperature cooking unit 25.

Referring to FIG. 1 to FIG. 3, the cooking appliance according to an embodiment may include the high-temperature cooking unit 25 together with the low-temperature cooking unit 100 in a single cooking appliance whose periphery may be defined by the cooktop case 21. As shown in FIG. 4 to FIG. 7, the low-temperature cooking unit 100 may include the configuration for vacuum-packing the food packing bag p containing food (see FIG. 12), and the configuration for heating the vacuum-packed food in the device whose frame is formed by the housing 110.

Initially, as shown in FIG. 5 and FIG. 7, the cover 145 may be rotated to open the inside of the low-temperature cooking unit 100, and the second container 120 may be filled with water or liquid as needed for cooking. The second container 120 may be filled with water or liquid after it is taken out of the first container 114 or while it is mounted in the first container 114. After the second container 120 is filled with the water or liquid, the container cover 123 may be covered over the container body 121.

If the food has been vacuum packed, the food may be directly put into the second container 120 to be cooked before the container cover 123 is covered. If the food has to be vacuum packed, it may be vacuum packed using the vacuum-packing module 150. Vacuum-packing by the vacuum-packing module 150 may be carried out as described below.

Initially, food to be cooked may be put into the food packing bag p (see FIG. 12), and then the opening of the food packing bag p may be placed at or in the vacuum-packing module 150, such that the food packing bag p may be ready for vacuum-packing. The end of the opening of the food packing bag p may be inserted into the packing bag slot 152c. The side surface closer to the opening of the food packing bag p located outside the packing bag slot 152c may be located on the supporting surface 152a of the vacuum panel 152 and the hot wire of the sealing heater 155. The rest of the food packing bag p, that is, the portion other than the portion closer to the vacuum-packing module 150 may be located above the second container 120, that is, on the seating surface 123a formed on the container cover 123 (see FIG. 12).

The food packing bag p may be placed first on the seating surface 123a formed on the container cover 123 so that the food packing bag p is located at a position for easy vacuum-packing. Subsequently, the end of the opening of the food packing bag p may be inserted into the packing bag slot 152c, such that the food packing bag p may be ready for vacuum-packing. A lower portion of the food packing bag p i may be supported by the seating surface 123a and a side portion of the food packing bag p may be surrounded by the first container 114, such that the food packing bag p may be stably accommodated in the space s in the first container 114.

When a food packing bag is vacuum-packed with its opening inserted into a vacuum-packing machine, it may be difficult to find an appropriate place to put the remaining portion of the food packing bag outside the vacuum-packing machine. Accordingly, a user may have to hold the bag so that the food inside the bag does not spill until the vacuum-packing is completed, which may be inconvenient. As the user has to hold the vacuum-packing machine with one hand to operation it, the user may have to hold the food packing bag with only one hand. Therefore, the user may perform the vacuum-packing in very unstable posture or position.

In contrast, the low-temperature cooking unit 100 may provide the support structure that supports a food packing bag to allow most of the food packing bag outside the vacuum-packing module 150 to be seated on the seating surface 123a on the second container 120 as described above. For example, the food packing bag p may be placed first on the seating surface 123a formed on the container cover 123 so that the food packing bag p is located at a position for easy vacuum-packing. Subsequently, the end of the opening of the food packing bag p may be inserted into the packing bag slot 152c, such that the food packing bag p may be ready for vacuum-packing.

The seating surface 123a on which the food packing bag p is seated may be lower than a plane formed by the packing bag slot 152c into which the opening of the food packing bag p is inserted. Therefore, the food packing bag p may be seated such that the opening of the food packing bag p is positioned higher than the rest of the food packing bag p seated on the second container 120. Thus, a user may not need to hold the food packing bag p, and the food packing bag p may be ready for vacuum-packing stably in the low-temperature cooking unit 100 such that food inside the bag p does not spill.

Once the food packing bag p is ready for vacuum-packing as described above, the cover 145 may be covered so that the food packing bag p is pressed between the vacuum panel 152 and the cover 145 as shown in FIG. 12 and FIG. 13. As the seating surface 123a is formed to be depressed downward, the space s may be formed between the covering area 145b of the cover 145 and the seating surface 123a of the container cover 123. Therefore, even when the cover 145 is covered, the portion of the food packing bag p seated on the seating surface 123a may be stably accommodated in the space s without being pressed by the cover 145.

When the cover 145 is covered and then the vacuum pump 153 is operated, vacuum pressure may be applied to the packing bag slot 152c. By the vacuum pressure, the inside of the food packing bag p may become vacuumed. In addition, when the sealing heater 155 is operated to perform the sealing after the vacuum-packing has been completed, the food packing bag p may be sealed in a vacuumed state, such that vacuum-packing on the food packing bag may be completed.

The hot wire of the sealing heater 155 that performs the sealing on the food packing bag p may be provided between the packing bag slot 152c and the first container 114, for example, between the packing bag slot 152 and the seating surface 123a. That is, the configuration for sealing the food packing bag p may be provided between a location where the configuration for vacuum-suction inside the food packing bag p and a location where the food packing bag p is seated and supported.

Therefore, the vacuum-packing may be carried out by the vacuum pressure generator 151 while the food packing bag p to be vacuum-packed is stably seated on the seating surface 123a formed on the container cover 123. In addition, the sealing may also be carried out by the sealing heater 155 effectively.

The above-described effect of the low-temperature cooking unit 100 may have a synergistic effect obtained by including the configuration for vacuum-packing the food packing bag p containing the food together with the configuration for heating the vacuum-packed food in a single device. That is, the vacuum-packing module 150 that vacuum-packs a food packing bag p and the second container 120 that heats the vacuum-packed food may be provided adjacent to each other in the single device, such that the support structure that supports the food packing bag p vacuum-packed by the vacuum-packing module 150 may be provided by the second container 120. Thus, the vacuum-packing may be carried out more conveniently and stably while keeping the food packing bag p in a stable state so that the user may not need to hold it, which may be cumbersome.

After the vacuum-packing by the vacuum-packing module 150 has been completed, the container cover 123 may be opened with the cover 145 opened, and the vacuum-packed food may be put into the second container 120 filled with water or liquid. Then, the container cover 123 and the cover 145 may be closed, and the heating unit 130 may be operated to heat the food to be cooked at a low temperature. The container cover 123 covering the container body 121 may prevent steam generated when the water or liquid inside the second container 120 is heated from leaking out of the second container 120, thereby blocking heat transfer to the cover 145 to prevent the cover 145 from being overheated.

Operation of the heating unit 130 may be started when the user operates the input unit 52 on the control panel 51 to enter a heating temperature and an operation signal. Accordingly, by heating the water in the second container 120 to an entered temperature with the electric heater 131 of the heating unit 130, the food may be cooked at a low temperature.

In the low-temperature cooking unit 100, an electronic component associated with operation of the heating unit 130, an electronic component associated with operation of the vacuum-packing module 150, an electronic component associated with connections therebetween, and an electronic component associated with supplying electricity, may be accommodated in the electronic device space a. The upper boundary of the electronic device space a may be defined by the vacuum-packing module 150, a part or portion of one of four side boundaries of the electronic device space a may be defined by the first container 114, and the lower boundary and three side boundaries of the electronic device space a may be defined by the barrier 28 and the cooktop case 21, respectively.

The electronic device space a may include the configuration for vacuum-packing the food packing bag p containing the food as well as the configuration for heating the vacuum-packed food. That is, the electronic device space a may be formed as the vacuum-packing module 150 having a relatively short length in the vertical or third direction is mounted adjacent to a side of the first container 114 having a relatively long length in the vertical or third direction. Therefore, the electronic device space a may be a unique space in the cooking appliance according to embodiments where the low-temperature cooking unit 100 is installed.

If the device for vacuum-packing the food packing bag p containing the food and the device for heating the vacuum-packed food are implemented as separate devices, a space for other electric components may have to be reserved for each of the devices or components. It may not be possible to design a shape of an external case such that each of the devices may have its own space, taking into account an overall appearance of the cooking appliance. Consequently, a size of the devices may be larger than is necessary.

In contrast, in the low-temperature cooking unit 100, the electronic components necessary for vacuum-packing and the electronic components necessary for heating the vacuum-packed food may be installed in the electronic device space a, which may be an integrated space. The electronic device space a may be a space that performs different functions in a single device. Therefore, a compact low-temperature cooking unit 100 may be implemented compared to a cooking appliance where there are separate devices.

After food has been cooked at a low-temperature in a vacuum by the low-temperature cooking unit 100, the food may be taken out of the food packing bag p and may be cooked again using the high-temperature cooking unit 25 or the oven 30 located around the low-temperature cooking unit 100. Cooking using the high-temperature cooking unit 25 or the oven 30 may be performed using the high-temperature cooking unit 25 or the oven 30 provided together in the cooking appliance without using additional space or devices. Therefore, food may be cooked more easily, quickly, and conveniently.

The low-temperature cooking unit 100 provided in the cooking appliance may be installed together with the high-temperature cooking unit 25 in the cooktop case 21 to form a single cooking appliance as described above or may be produced and used as a separate appliance for low-temperature vacuum cooking.

Figure 17:
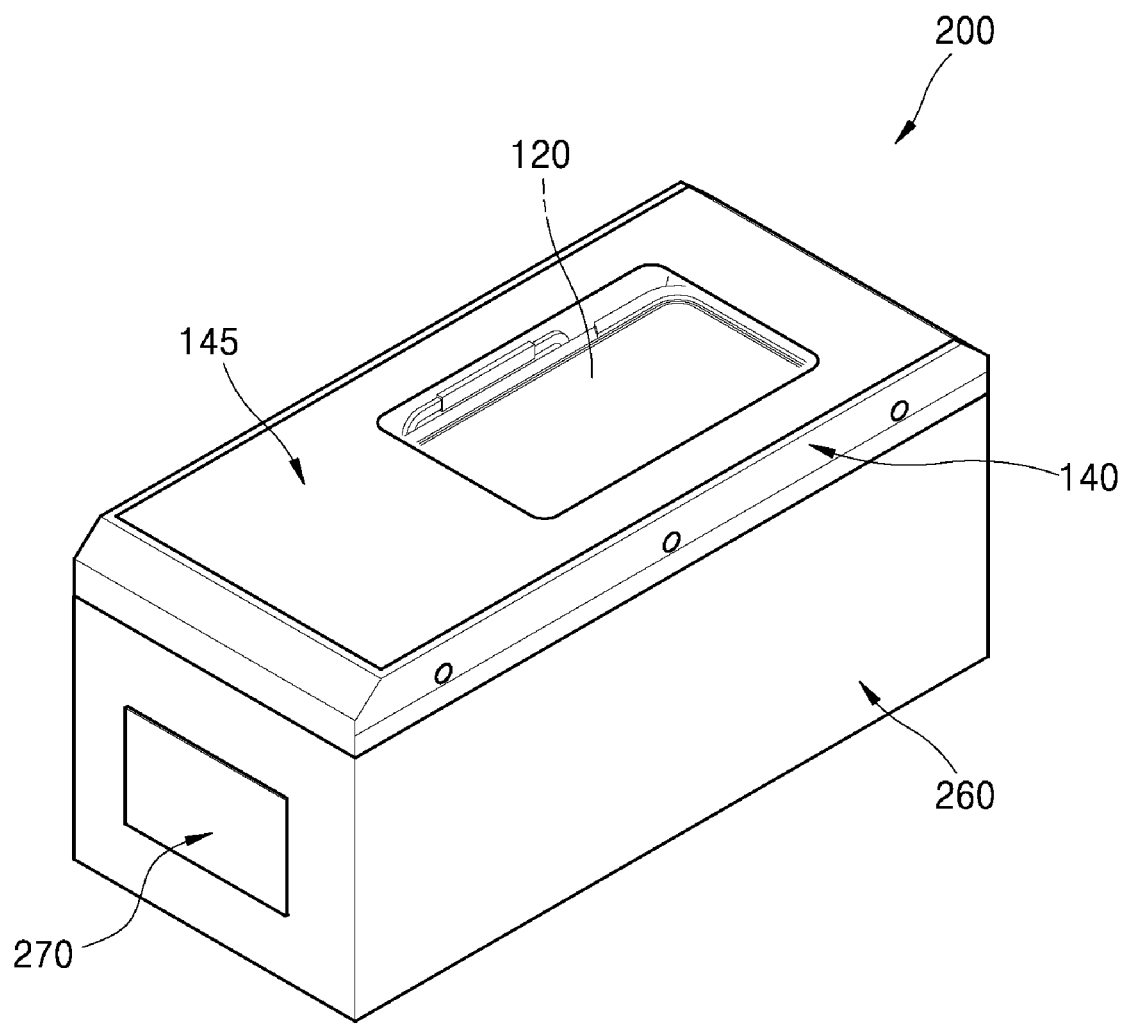
FIG. 17 is a perspective view of a low-temperature vacuum cooking device according to another embodiment.
Figure 18:
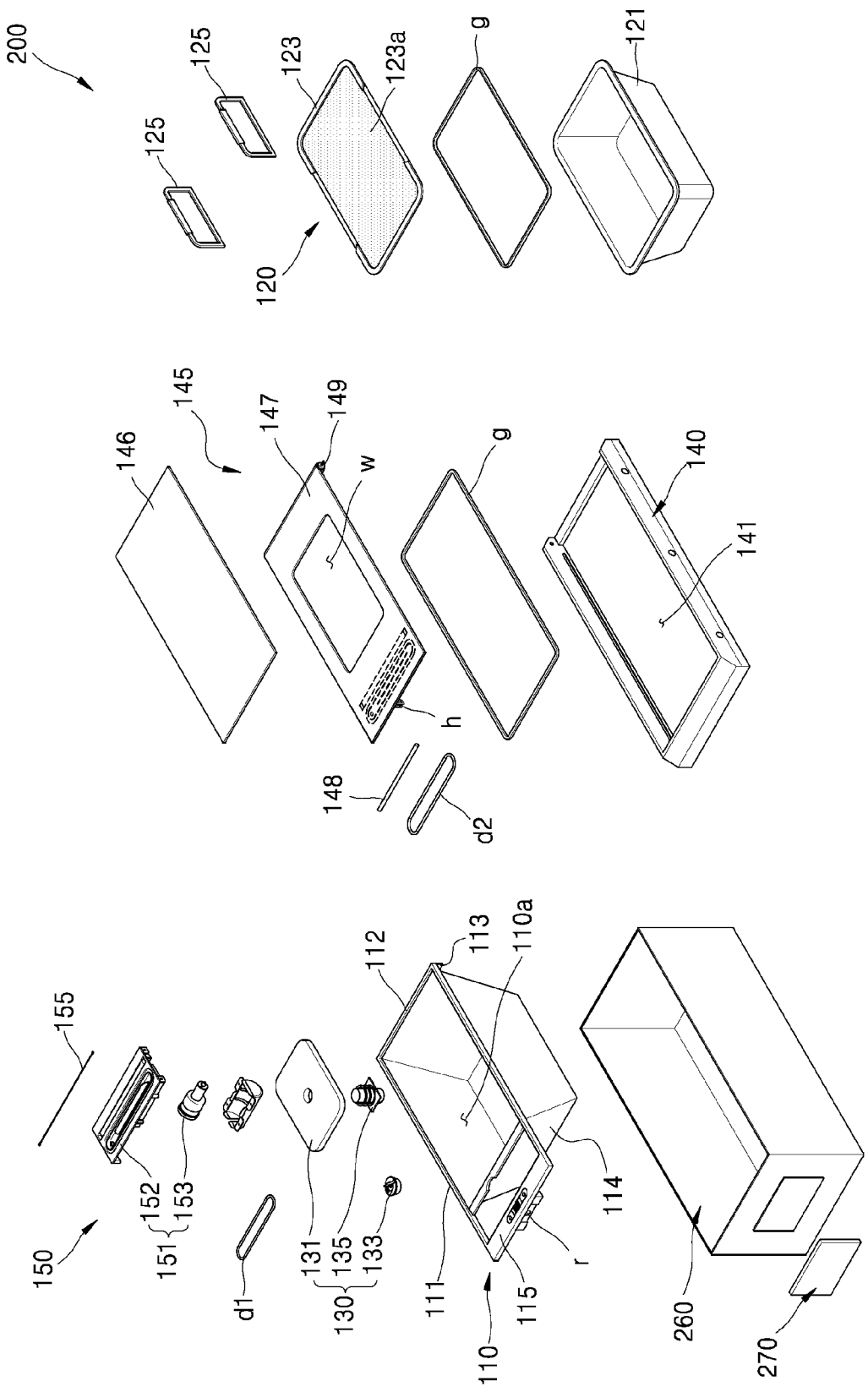
FIG. 18 is an exploded perspective view of the low-temperature vacuum cooking device shown in FIG. 17.

FIG. 17 is a perspective view of a low-temperature vacuum cooking device according to another embodiment. FIG. 18 is an exploded perspective view of the low-temperature vacuum cooking device shown in FIG. 17. When the low-temperature cooking unit is produced as a low-temperature vacuum cooking appliance 200, which may be a standalone device for low-temperature vacuum cooking, the low-temperature vacuum cooking appliance 200 may include an external case 260 and a control panel 270.

The external case 260 may form an exterior of low-temperature cooking unit 100 together with cover mount 140 and cover 145. The external case 260 may be coupled to the housing 110 on an outer side thereof to accommodate the housing 110 therein. In the external case 260, a space for the housing 110 and the electronic device space a may be formed.

The external case 260 may be formed in a box shape having an accommodating space therein with its top open. The external case 260 may be coupled with the housing 110 such that an upper periphery thereof may be coupled with the bent extensions 112 and 113, or such that the upper periphery thereof may be coupled with a lower periphery of the cover mount 140.

The vacuum-packing module mount 115 in the housing 110 accommodated in the external case 260 may be formed in a shape of a polygonal frame that protrudes forward from the first container 114, with a bottom face thereof higher than a bottom face of the first container 114. Under the vacuum-packing module mount 115, the electronic device space a may be formed. The electronic device space a may be a region located at a front of the container mount 111, and may include a region located lower than the vacuum-packing module 150 mounted on the vacuum-packing module mount 115.

The external case 260 may form a space that accommodates the housing 110, the first container 114, and the electronic device space a. The external case 260 may define an outer boundary of the electronic device space a. That is, the upper boundary of the electronic device space a may be defined by the vacuum-packing module 150, a part or portion of one of four side boundaries of the electronic device space a may be defined by the first container 114, and the lower boundary and three side boundaries of the electronic device space a may be defined by the external case 260.

The first container 114 may have a shape having a length in the vertical or third direction at least longer than a length in the vertical or third direction of the second container 120 to accommodate the second container 120. On the other hand, the vacuum-packing module mount 115 and the vacuum-packing module 150 may not need to accommodate a large component, such as the second container 120, and thus, may not need to having a length equal to that of the first container 114 in the vertical or third direction. Therefore, there may be a free space where no component directly associated with the vacuum-packing module 150 is provided under the vacuum-packing module mount 115 and the vacuum-packing module 150. The space obtained at the front side in the external case 260 may be the electronic device space a.

The electronic device space a may accommodate an electronic component associated with operation of the heating unit 130, an electronic component associated with operation of a control panel 270, an electronic component associated with connections therebetween, and an electronic component associated with supplying electricity. In addition, the electronic device space a may include a cooling fan to cool down the electronic components installed in the electronic device space a.

The control panel 270 may be provided on or at a front face of the external case 260, that is, at a front of the low-temperature cooking unit 100. The control panel 270 may have a box shape having an internal space. An input unit or input may be provided at a front of the control panel 270 where a user may input operation signals to operate the heating unit 130 and the vacuum-packing module 150.

The input unit may be provided with a plurality of operation switches through which a user may directly enter operation signals. The control panel 270 may further include a display that displays information of the low-temperature cooking appliance 200. A user may see various information of the cooking appliance via the display.

The control panel 270 may be installed on the external case 260, for example, on a side of the external case 260 adjacent to the electronic device space a. As the control panel 270 is installed at a portion adjacent to the electrical space a, a variety of electronic components installed in the electronic device space a may be efficiently connected to the control panel 270, and connection lines may be simpler.

Embodiments disclosed herein provide a cooking appliance that may cook food using a cooktop, using an oven, vacuum-packing, sous-vide cooking, and cooking after sous-vide cooking in a single device, without additionally requiring different devices. Accordingly, the cooking appliance may be economically advantageous and efficient.

Further, the cooking appliance may provide a heat blocking structure that blocks heat generated in a high-temperature cooking unit from affecting operation of a low-temperature cooking unit by using a barrier provided between the high-temperature cooking unit and the low-temperature cooking unit. In addition, the cooking appliance may provide a support structure that supports the high-temperature cooking unit and the low-temperature cooking unit so as to prevent sagging and detaching at a boundary therebetween. Accordingly, the cooking appliance may have operational stability, structural stability, and an improved exterior.

Also, the cooking appliance may perform vacuum-packing while keeping a food packing bag stable so that food does not spill even though a user may not hold the food packing bag. Accordingly, the vacuum-packing may be carried out more conveniently and stably.

The low-temperature cooking unit may be installed together with the high-temperature cooking unit in a cooktop case to form a single cooking appliance, or may be implemented as a standalone device for low-temperature vacuum cooking without substantially changing a configuration thereof. Accordingly, it may be possible to easily and quickly produce a variety of cooking appliances at a low cost.

In the drawings, the thickness of lines or the size of the elements may be exaggerated and not drawn on scale for the purposes of clarity and convenience. In the previous description, the terms or words used in the specification and claims shall not be construed merely in a conventional and dictionary definition but shall be construed in a meaning and concept corresponding to the technical idea of the present disclosure based on the principle that an inventor is allowed to properly define the concepts of terms in order to describe his or her disclosure in the best way. Therefore, the definition of such terminologies should be construed based on the contents throughout the specification.

When an element or layer is referred to as being "on" another element or layer, the element or layer may be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

Although the terms "first", "second", "third", etc., may be used herein to describe various elements, components, regions, layers and/or sections, these elements, components, regions, layers and/or sections may not be limited by these terms. These terms are only used to distinguish one element, component, region, layer or section from another region, layer or section. Thus, a first element, component, region, layer or section may be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. The spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" may encompass both an orientation of above and below. The device may be otherwise oriented, for example, rotated 90 degrees or at other orientations, and the spatially relative descriptors used herein may be interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cooking appliance, comprising:
a housing including a container mount and a vacuum-packing module mount provided adjacent to each other;
a first container having a space to accommodate a liquid therein, the first container being configured to be coupled with the container mount;
a heater that heats a liquid accommodated in the first container;
a vacuum pressure generator installed on the vacuum-packing module mount to suction air inside a food packing bag;
a sealer installed adjacent to the vacuum pressure generator that heats the food packing bag in order to seal it;
a cover rotatably installed on the housing to cover or open the first container and the vacuum pressure generator; and
a high-temperature cooking unit including a top plate, and a high-temperature heater provided at a lower portion of the top plate, wherein the cover is flush with the top plate when the cover covers the first container and the vacuum pressure generator.

2. The cooking appliance of claim 1, further comprising:
a cooktop case having an internal space divided into a first area and a second area adjacent to each other, wherein the high-temperature cooking unit is located in the first area of the cooktop case, and wherein the housing, the first container, the heater, the vacuum pressure generator, the sealer, and the cover are located in the second area of the cooktop case.

3. The cooking appliance of claim 2, further comprising:
a barrier installed in the cooktop case to divide the internal space of the cooktop case into the first area and the second area.

4. The cooking appliance of claim 3, wherein the barrier includes a diaphragm having a height that extends upwardly from a bottom surface of the cooktop case, and a length that extends from a front surface to a rear surface of the cooktop case, and wherein the diaphragm has a bent portion that is bent in a longitudinal direction thereof.

5. The cooking appliance of claim 4, wherein the diaphragm includes a first projecting surface that forms a plane in a vertical direction and protrudes toward the first area, a second projecting surface that forms a plane in the vertical direction and protrudes toward the second area, and a connecting surface that connects the first projecting surface with the second projecting surface, and wherein the bent portion is formed between the first projecting surface and the connecting surface and between the connecting surface and the second projecting surface, such that the first projecting surface, the connecting surface, and the second projecting surface are connected with one another in a longitudinal direction of the diaphragm.

6. The cooking appliance of claim 5, further comprising:
a top-plate coupler that couples the top plate with the barrier so that one side of the top plate adjacent to the barrier is fixed to the barrier.

7. The cooking appliance of claim 6, wherein a first side of the top-plate coupler is coupled with the first projecting surface and a second side of the top-plate coupler is coupled with the top plate.

8. The cooking appliance of claim 5, further comprising:
a cover mount installed on the housing, wherein the housing includes a bent extension that protrudes outwardly from the housing to form a coupling surface with the cover mount on an upper end of the housing, and wherein a bottom face of the bent extension and/or the cover mount contacts an upper end of the barrier, and the housing is supported by the barrier.

9. The cooking appliance of claim 8, wherein a bottom face of the bent extension and/or the cover mount contacts upper ends of the second projecting surface and the connecting surface, and the housing is supported by the barrier.

10. The cooking appliance of claim 2, wherein the vacuum-packing module mount is provided at an upper front of the housing adjacent to the container mount, wherein an electronic device space is formed under the vacuum-packing module mount, and wherein the electronic device space includes an area surrounded by the vacuum-packing module mount, the first container, and a bottom surface and a side surface of the cooktop case.

11. The cooking appliance of claim 1, wherein the container mount and the vacuum-packing module mount of the housing are integrally connected with each other.

12. The cooking appliance of claim 11, wherein the first container has a box shape having an accommodating space and an open top, and wherein the vacuum-packing module mount has a polygonal frame shape that protrudes in a lateral direction from the container mount where the first container is installed.

13. The cooking appliance of claim 1, wherein the heater is a low-temperature heater that heats a liquid contained in the first container to a temperature of 100° C. or lower.

14. The cooking appliance of claim 1, further comprising:
a cooktop case having an internal space divided into a first area and a second area adjacent to each other, wherein the high-temperature cooking unit is located in the first area of the cooktop case; and
a low-temperature cooking unit including the housing, the first container, the heater, the vacuum pressure generator, the sealer, and the cover and located in the second area of the cooktop case.

15. The cooking appliance of claim 14, wherein the low-temperature cooking unit is detachable from the cooktop case, and wherein the low-temperature cooking unit further includes an external case coupled with the housing on an outer side thereof to accommodate the housing therein, and a control panel installed on the external case.

16. A hybrid cooking appliance, comprising:
a cooktop case including a barrier that divides the cooktop case into a first area and a second area;
a high-temperature cooking unit including a top plate provided in the first area; and
a low-temperature cooking unit located in the second area of the cooktop case, the low-temperature cooking unit including:
a housing including a container mount and a vacuum-packing module mount provided adjacent to each other;
an electronic device space formed under the vacuum-packing module mount;
a container having a space to accommodate a liquid therein, the container being configured to be coupled with the container mount;
a heater that heats a liquid accommodated in the container;
a vacuum pressure generator installed on the vacuum-packing module mount to suction air inside a food packing bag;
a sealer installed adjacent to the vacuum pressure generator that heats the food packing bag in order to seal it; and a cover rotatably installed on the housing to cover or open the container and the vacuum pressure generator.

* * * * *